US012252192B2

(12) United States Patent
Ishikawa et al.

(10) Patent No.: US 12,252,192 B2
(45) Date of Patent: Mar. 18, 2025

(54) STEERING DEVICE

(71) Applicant: KNORR-BREMSE COMMERCIAL VEHICLE SYSTEMS JAPAN LTD., Sakado (JP)

(72) Inventors: Shogo Ishikawa, Higashimatsuyama (JP); Takashi Sasaki, Higashimatsuyama (JP)

(73) Assignee: KNORR-BREMSE COMMERCIAL VEHICLE SYSTEMS JAPAN LTD., Sakado (JP)

( * ) Notice: Subject to any disclaimer, the term of this patent is extended or adjusted under 35 U.S.C. 154(b) by 0 days.

(21) Appl. No.: 18/569,358

(22) PCT Filed: Jun. 8, 2022

(86) PCT No.: PCT/JP2022/023067
§ 371 (c)(1),
(2) Date: Dec. 12, 2023

(87) PCT Pub. No.: WO2022/264890
PCT Pub. Date: Dec. 22, 2022

(65) Prior Publication Data
US 2024/0270306 A1 Aug. 15, 2024

(30) Foreign Application Priority Data
Jun. 14, 2021 (JP) ................. 2021-098408

(51) Int. Cl.
*B62D 5/24* (2006.01)
*B62D 3/08* (2006.01)
(52) U.S. Cl.
CPC ................. *B62D 5/24* (2013.01); *B62D 3/08* (2013.01)

(58) Field of Classification Search
CPC ... B62D 5/24; B62D 3/04; B62D 3/06; B62D 3/08; B62D 3/10; F16H 55/28; F16H 57/12; F16H 2057/126; F16H 2057/127
See application file for complete search history.

(56) References Cited

U.S. PATENT DOCUMENTS

| 4,217,811 A * | 8/1980 | Dzioba ................... B62D 5/24 91/375 A |
| 4,228,696 A | 10/1980 | Jablonsky | |
| 8,833,506 B2 * | 9/2014 | Sunaga ................. B62D 5/063 180/417 |

FOREIGN PATENT DOCUMENTS

| JP | 54-031132 A | 3/1979 |
| JP | 61102381 A * | 5/1986 |

(Continued)

OTHER PUBLICATIONS

International Preliminary Report on Patentability PCT/JP2022/023067 mail date Dec. 28, 2023 (12 pages).

Primary Examiner — Laura Freedman
(74) Attorney, Agent, or Firm — Foley & Lardner LLP

(57) ABSTRACT

In a steering device (PS1) according to the present embodiment, a preload applying mechanism (6) provides a rotation torque to one side in a rotation direction of a ball nut (4) by a reaction force generated by elastic abutment of a plunger (61) on a tooth tip of a first sector tooth (321) of a sector gear (32). Therefore, in the steering device (PS1), unlike conventional steering device, there is no need to provide a pressed portion to be pressed by the plunger (61) separately from the sector gear (32). Increase in size of a sector shaft (3) due to formation of the pressed portion can therefore be suppressed.

8 Claims, 10 Drawing Sheets

(56) References Cited

FOREIGN PATENT DOCUMENTS

| | | | | |
|---|---|---|---|---|
| JP | S62210166 | A | * | 9/1987 |
| JP | 05-086754 | U | | 11/1993 |
| JP | H05-319285 | A | | 12/1993 |
| JP | H0647079 | U | * | 6/1994 |
| JP | 2024066137 | A | * | 5/2024 |
| WO | WO-2024106456 | A1 | * | 5/2024 |

* cited by examiner

STEERING DEVICE

TECHNICAL FIELD

The present invention relates to a steering device.

BACKGROUND ART

As a conventional steering device, for instance, a steering device disclosed in the following Patent Document 1 is known.

That is, the steering device according to the following Patent Document 1 is configured so that a steering shaft linked to a steering wheel and a sector shaft linked to steered wheels are arranged in an intersecting manner, and rack teeth formed at a ball nut that is screwed onto the steering shaft are engaged with a sector gear provided at the sector shaft.

Further, a preload mechanism for adjusting backlash between the rack teeth and the sector gear at a neutral position of the sector shaft is provided between the ball nut and the sector shaft. This preload mechanism includes a plunger that is embedded in the ball nut at a position facing an axial direction end portion of the sector gear together with a forcing member and forced toward the sector gear via the forcing member, and a plunger sliding-contact portion that is provided at the sector shaft and configured with a cam profile that can come into elastic contact with the plunger within a predetermined rotation range with the neutral position of the sector shaft being a center. That is, the preload mechanism forces the ball nut to one side in the rotation direction based on a reaction force from the plunger sliding-contact portion which is generated by the elastic contact of the plunger with the plunger sliding-contact portion within the predetermined range with the neutral position of the sector shaft being the center. Therefore, the preload mechanism can reduce the backlash between the rack teeth and the sector gear around the neutral position of the sector shaft.

CITATION LIST

Patent Document

Patent Document 1: Japanese Unexamined Patent Application Publication No. JPH05-319285

SUMMARY OF THE INVENTION

Technical Problem

In the case of the conventional steering device, however, it is necessary to provide the plunger sliding-contact portion separately from the sector gear. Because of this, there is still room for improvement in that a size of the sector shaft in the axial direction is increased by a size of the plunger sliding-contact portion.

The present invention was made in view of the above technical problem. An object of the present invention is therefore to provide a steering device that is capable of suppressing increase in size of the sector shaft.

Solution to Problem

As one aspect of the present invention, a steering device comprises: a rack teeth formed at an outer side of a ball nut screwed onto a steering shaft that is linked to a steering wheel; a sector gear provided at a sector shaft that is linked to steered wheels, wherein the sector gear has a plurality of sector teeth including a central tooth that is most deeply engaged with the rack teeth in a neutral position state of the sector shaft which corresponds to a straight-ahead steering state, the plurality of sector teeth including the central tooth are provided in a circumferential direction of the sector shaft, and the sector gear is engaged with the rack teeth by the plurality of sector teeth including the central tooth; and a preload applying mechanism adjusting engagement between the rack teeth and the sector gear in a vicinity of the neutral position of the sector shaft, wherein the preload applying mechanism is provided at one end portion in a tooth width direction of a specific tooth bottom of the rack teeth, which faces a tooth tip of the central tooth when the sector shaft is in the vicinity of the neutral position, and the preload applying mechanism forces the ball nut to one side in a rotation direction of the ball nut by a reaction force generated by elastic contact of the preload applying mechanism with the tooth tip of the central tooth.

As described above, in the present invention, the preload applying mechanism is configured to provide a rotation torque to the ball nut by the elastic contact (elastic abutment) of the preload applying mechanism with (on) the tooth tip of the central tooth of the sector gear. Therefore, in the present invention, unlike the conventional steering device, there is no need to provide a pressed portion to be pressed by the preload applying mechanism separately from the sector gear. Increase in size of the sector shaft due to formation of the pressed portion can therefore be suppressed.

As another aspect of the steering device, it is desirable that the preload applying mechanism has a plunger receiving hole formed at the specific tooth bottom, a plunger which is accommodated in the plunger receiving hole so as to be able to move forward and backward and whose top end side can protrude from an opening, facing the sector gear, of the plunger receiving hole, and a forcing member interposed between a bottom of the plunger receiving hole and the plunger and forcing the plunger toward the central tooth.

That is, in the present invention, the preload applying mechanism is configured by only the plunger receiving hole formed at the ball nut, the forcing member and the plunger both accommodated in the plunger receiving hole. Then, by pressing the tooth tip of the central tooth of the sector gear by the plunger, the rotation torque to the ball nut is generated.

As described above, in the present invention, the preload applying mechanism has a simple configuration formed by only the plunger, the forcing member and the plunger receiving hole accommodating therein these plunger and forcing member. Therefore, unlike the conventional steering device, there is no need to process (machine) or form the pressed portion of the plunger. The preload applying mechanism can therefore be configured at a relatively low cost, thereby reducing a manufacturing cost of the steering device.

As still another aspect of the steering device, it is desirable that the plunger has a large diameter portion sliding in the plunger receiving hole, and a small diameter portion whose diameter is reduced stepwise with respect to the large diameter portion and which can protrude from the opening of the plunger receiving hole, the plunger receiving hole has a stopper which is formed by reducing an inside diameter of the opening to be smaller than an outside diameter of the large diameter portion and which restricts a protruding amount of the small diameter portion by coming into contact with the large diameter portion, in a state in which a rotation phase of the sector shaft is in the vicinity of the neutral position, the large diameter portion does not come into contact with the stopper, and contact of the plunger with the central tooth is allowed, and in a state in which the rotation phase of the sector shaft exceeds the vicinity of the neutral position, the large diameter portion comes into contact with the stopper, and the contact of the plunger with the central tooth is restricted.

That is, the present invention is configured so that when the rotation phase of the sector shaft is in the vicinity of the neutral position of the steering, the contact of the plunger with the central tooth is allowed, whereas when the rotation phase of the sector shaft exceeds the vicinity of the neutral position, the contact of the plunger with the central tooth is restricted by the stopper.

As described above, by restricting the protruding amount of the plunger by the stopper, only in the vicinity of the neutral position of the sector shaft which requires rigidity, the engagement between the rack teeth and the sector gear can be adjusted. In other words, except when the sector shaft is in the vicinity of the neutral position which does not particularly require the rigidity, by restricting the contact of the plunger with the central tooth, deterioration of steering feeling, such as so-called grinding feeling caused by sliding-contact of the plunger with the central tooth, can be suppressed.

Further, in the present invention, the stopper is structured only by narrowing the opening of the plunger receiving hole. Therefore, unlike the conventional steering device, it is possible to restrict the protruding amount of the plunger by the relatively simple structure without forming the complicated or sophisticate cam profile, which can contribute to reduction in manufacturing cost of the steering device.

As still another aspect of the steering device, it is desirable that a tooth bottom of the sector gear is formed as a flat surface parallel to a rotation axis of the sector shaft.

As described above, in the present invention, the tooth bottom of the sector gear has a straight shape parallel to the rotation axis of the sector shaft. That is, the present invention is configured so that unlike the conventional steering device, without forming the tooth bottom of the sector gear into a tapered shape and without providing a mechanism adjusting the engagement between the rack teeth and the sector gear other than the preload applying mechanism, the engagement between the rack teeth and the sector gear is adjusted by only the preload applying mechanism. Therefore, the structure or configuration of the steering device is simplified, thereby contributing to improvement in productivity of the steering device and reduction in the manufacturing cost of the steering device.

As still another aspect of the steering device, it is desirable that a tooth bottom of the sector gear has such tapered surface that a tooth height of the sector gear gradually increases toward one end side in an axial direction of the sector shaft, and the sector shaft is configured to be movable to the one end side in the axial direction of the sector shaft by an adjustment screw that is screwed from the other end side in the axial direction of the sector shaft through a female screw hole that is formed at an end wall of a housing accommodating therein the sector shaft.

As described above, in the present invention, the sector gear has a tapered gear shape in which the tooth bottom of the sector gear is the tapered surface, and by moving the sector shaft to the one end side in the axial direction by the adjustment screw, the engagement between the rack teeth and the sector gear can be adjusted. With this, not only in the vicinity of the neutral position of the sector shaft, but also in the entire rotation range of the sector shaft, proper engagement between the rack teeth and the sector gear can be ensured.

As still another aspect of the steering device, it is desirable that one end side in an axial direction of the sector shaft with respect to the sector gear, which is a side connected to a pitman arm, is formed so as to have a relatively large diameter, and the other end side in the axial direction of the sector shaft with respect to the sector gear is formed so as to have a relatively small diameter as compared with that of the one end side in the axial direction of the sector shaft, and the plunger receiving hole is provided at one of both end portions in the tooth width direction of the specific tooth bottom, which corresponds to the other end side in the axial direction of the sector shaft.

As described above, in the present invention, the plunger receiving hole forming the preload applying mechanism is arranged at a side where the diameter of the sector shaft is relatively small. Therefore, the preload applying mechanism can be arranged at a position farther away from a rotation center of the ball nut by a distance equivalent to reduction in diameter of the sector shaft. With this, a greater rotation torque can be provided to the ball nut, thereby adjusting the engagement between the rack teeth and the sector gear more effectively.

In addition, from another viewpoint, as one aspect of the present invention, a steering device comprises: a rack teeth formed at an outer side of a ball nut screwed onto a steering shaft that is linked to a steering wheel; a sector gear provided at a sector shaft that is linked to steered wheels, wherein the sector gear has a plurality of sector teeth including a central tooth that is most deeply engaged with the rack teeth in a neutral position state of the sector shaft which corresponds to a straight-ahead steering state, the plurality of sector teeth including the central tooth are provided in a circumferential direction of the sector shaft, and the sector gear is engaged with the rack teeth by the plurality of sector teeth including the central tooth; and a preload applying mechanism adjusting engagement between the rack teeth and the sector gear in a vicinity of the neutral position of the sector shaft, wherein the preload applying mechanism is provided at one end portion in a tooth width direction of the central tooth, and the preload applying mechanism forces the ball nut to one side in a rotation direction of the ball nut by a forcing force generated by elastic contact of the preload applying mechanism with a specific tooth bottom of the rack teeth which faces a tooth tip of the central tooth when the sector shaft is in the vicinity of the neutral position.

That is, in the present invention, the preload applying mechanism is configured to provide a rotation torque to the ball nut by the elastic contact (elastic abutment) of the preload applying mechanism with (on) the specific tooth bottom of the rack teeth. Also in the case where the preload applying mechanism is provided at the sector gear side as described above, there is no need to provide a pressed portion to be pressed by the preload applying mechanism separately from the sector gear. Increase in size of the sector shaft due to formation of the pressed portion can therefore be suppressed.

As another aspect of the steering device, it is desirable that the preload applying mechanism has a plunger receiving hole formed at the central tooth, a plunger which is accommodated in the plunger receiving hole so as to be able to move forward and backward and whose top end side can protrude from an opening, facing the specific tooth bottom of the rack teeth, of the plunger receiving hole, and a forcing member interposed between a bottom of the plunger receiving hole and the plunger and forcing the plunger toward the specific tooth bottom.

As described above, also in the case where the preload applying mechanism is provided at the sector gear side, the preload applying mechanism has a simple configuration formed by only the plunger, the forcing member and the plunger receiving hole accommodating therein these plunger and forcing member. Therefore, unlike the conventional steering device, there is no need to process (machine) or form the pressed portion of the plunger. The preload applying mechanism can therefore be configured at a relatively low cost, thereby reducing a manufacturing cost of the steering device.

As still another aspect of the steering device, it is desirable that the plunger has a large diameter portion sliding in the plunger receiving hole, and a small diameter portion whose diameter is reduced stepwise with respect to the large diameter portion and which can protrude from the opening of the plunger receiving hole, the plunger receiving hole has a stopper which is formed by reducing an inside diameter of the opening to be smaller than an outside diameter of the large diameter portion and which restricts a protruding amount of the small diameter portion by coming into contact with the large diameter portion, in a state in which a rotation phase of the sector shaft is in the vicinity of the neutral position, the large diameter portion does not come into contact with the stopper, and contact of the plunger with the specific tooth bottom is allowed, and in a state in which the rotation phase of the sector shaft exceeds the vicinity of the neutral position, the large diameter portion comes into contact with the stopper, and the contact of the plunger with the specific tooth bottom is restricted.

As described above, also in the case where the preload applying mechanism is provided at the sector gear side, by restricting the protruding amount of the plunger by the stopper, only in the vicinity of the neutral position of the sector shaft which requires rigidity, the engagement between the rack teeth and the sector gear can be adjusted. In other words, except when the sector shaft is in the vicinity of the neutral position which does not particularly require the rigidity, by restricting the contact of the plunger with the specific tooth bottom, deterioration of steering feeling, such as so-called grinding feeling caused by sliding-contact of the plunger with the specific tooth bottom, can be suppressed.

Further, in the present invention, the stopper is structured only by narrowing the opening of the plunger receiving hole. Therefore, unlike the conventional steering device, it is possible to restrict the protruding amount of the plunger by the relatively simple structure without forming the complicated or sophisticate cam profile, which can contribute to reduction in manufacturing cost of the steering device.

As still another aspect of the steering device, it is desirable that one end side in an axial direction of the sector shaft with respect to the sector gear, which is a side connected to a pitman arm, is formed so as to have a relatively large diameter, and the other end side in the axial direction of the sector shaft with respect to the sector gear is formed so as to have a relatively small diameter as compared with that of the one end side in the axial direction of the sector shaft, and the plunger receiving hole is provided at one of both end portions in the tooth width direction of the central tooth, which corresponds to the other end side in the axial direction of the sector shaft.

As described above, also in the case where the preload applying mechanism is provided at the sector gear side, the plunger receiving hole forming the preload applying mechanism is arranged at a side where the diameter of the sector shaft is relatively small. Therefore, the preload applying mechanism can be arranged at a position farther away from a rotation center of the ball nut by a distance equivalent to reduction in diameter of the sector shaft. With this, a greater rotation torque can be provided to the ball nut, thereby adjusting the engagement between the rack teeth and the sector gear more effectively.

Effects of Invention

According to the present invention, the preload applying mechanism is configured to provide the rotation torque to the ball nut by the elastic contact (elastic abutment) of the preload applying mechanism with (on) the tooth tip of the central tooth of the sector gear or the elastic contact (elastic abutment) of the preload applying mechanism with (on) the specific tooth bottom of the rack teeth. Therefore, unlike the conventional steering device, there is no need to provide a pressed portion to be pressed by the preload applying mechanism separately from the sector gear. Increase in size of the sector shaft due to formation of the pressed portion can therefore be suppressed.

BRIEF DESCRIPTION OF THE DRAWINGS

FIG. 4A is a neutral state in which a steering angle is 0 degree.

FIG. 4B is a steering state in which the steering angle 12 degrees. FIG. 4C is a steering state in which the steering angle 25 degrees.

EMBODIMENTS FOR CARRYING OUT THE INVENTION

Embodiments of a steering device according to the present invention will be described below with reference to the drawings. In each of the following embodiments, an example in which the steering device is applied as an integral-type power steering device used for a large vehicle such as a truck is illustrated.

First Embodiment (Configuration of Steering Device)

Figure 1:
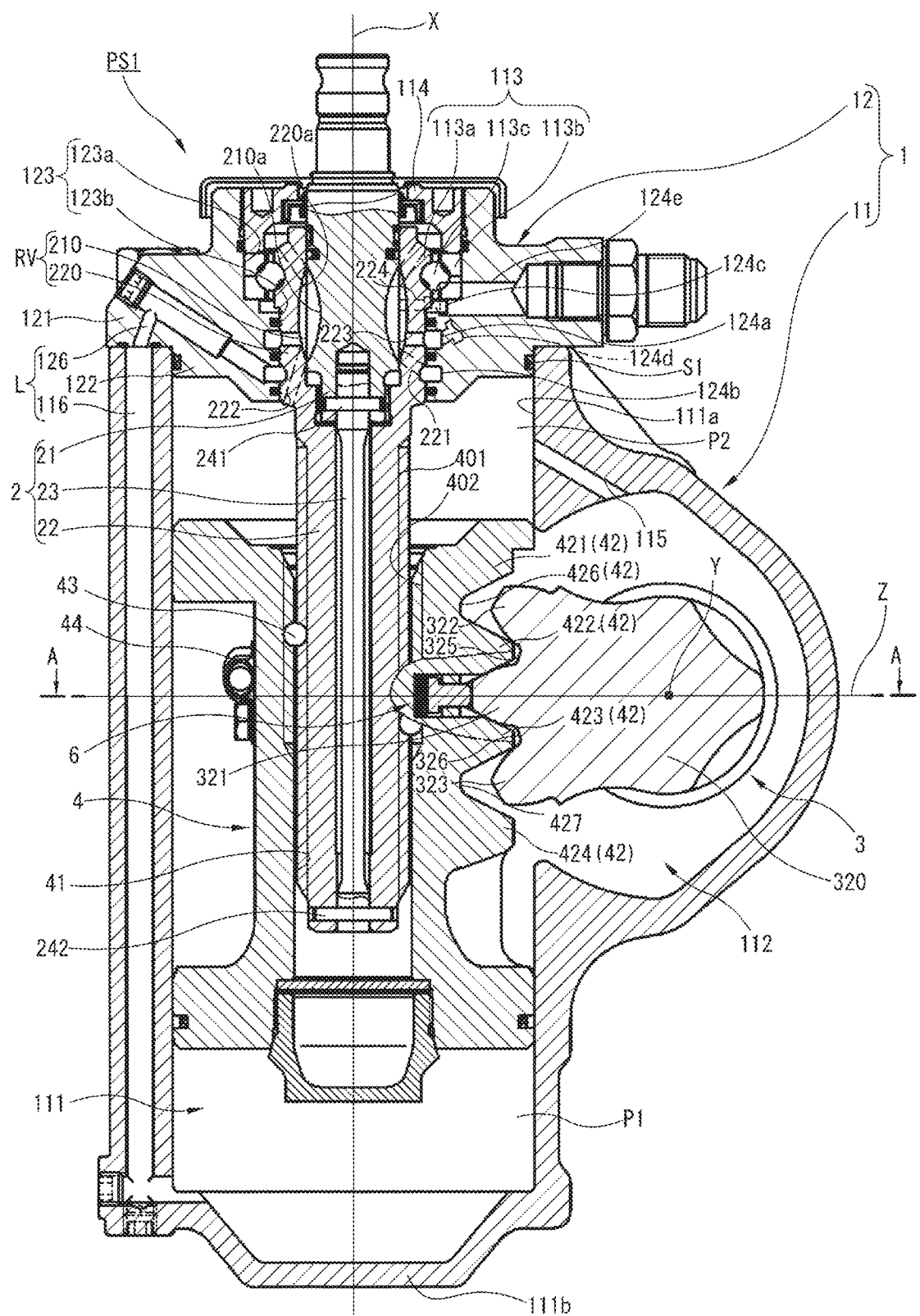
FIG. 1 is a longitudinal cross section of a steering device according to a first embodiment of the present invention.
Figure 2:
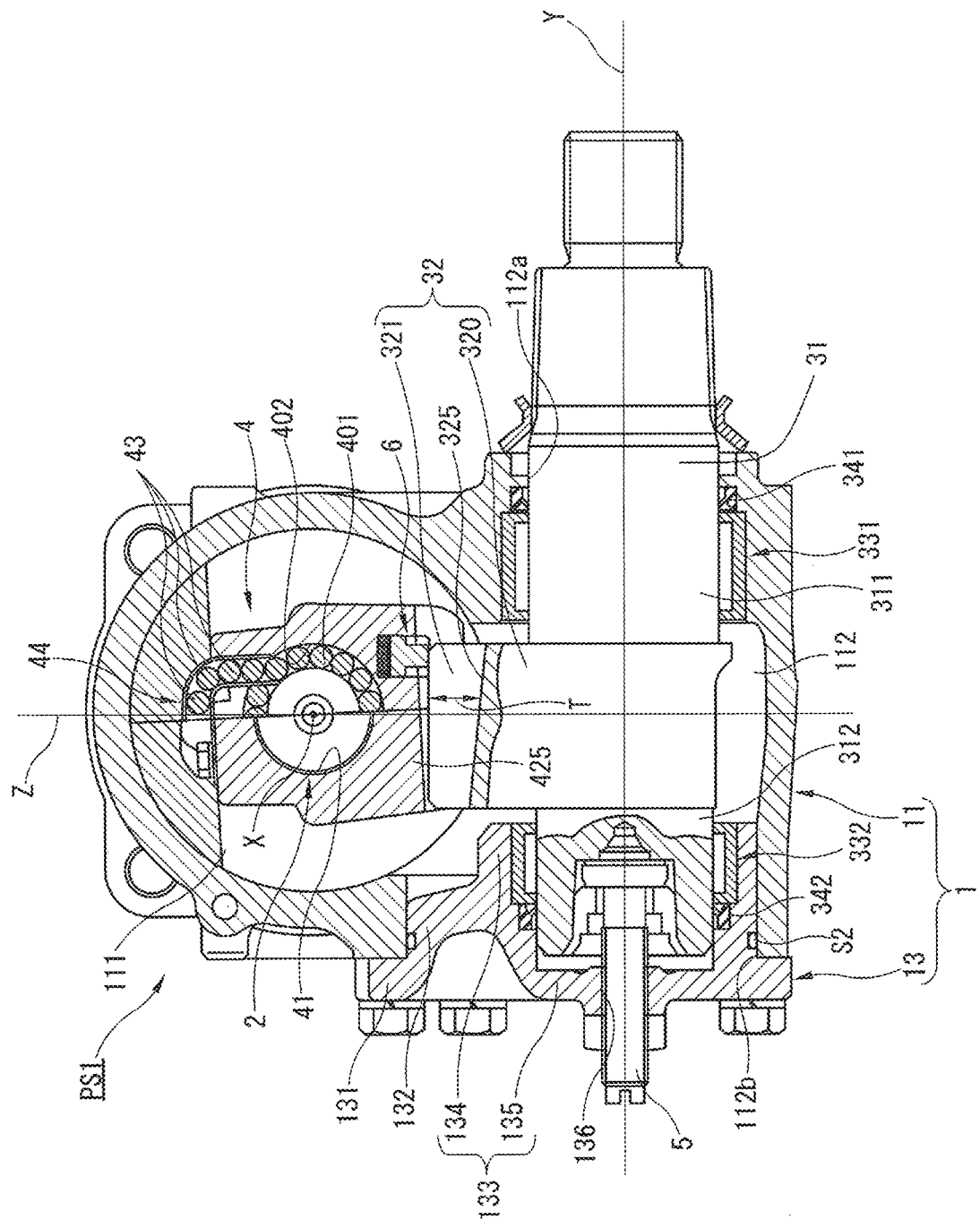
FIG. 2 is a sectional view taken along a plane A-A of FIG. 1.

FIG. 1 is a first embodiment of a steering device according to the present invention, showing a longitudinal cross section of the steering device PS1 cut along a rotation center of a steering shaft 2. FIG. 2 shows a cross section of the steering device PS1 cut along a plane A-A of FIG. 1. In the following description, a side where the steering shaft 2 is linked to a steering wheel (not shown) in a rotation axis X direction of the steering shaft 2 of FIG. 1 is referred to as "one end side", and a side where the steering shaft 2 is linked to a ball nut 4 is referred to as "the other end side". Also, a side where a sector shaft 3 is linked to steered wheels (not shown) in a rotation axis Y direction of the sector shaft 3 of FIG. 2 is referred to as "one end side", and a side where the sector shaft 3 is linked to the ball nut 4 is referred to as "the other end side".

As illustrated in FIGS. 1 and 2, the steering device PS1 is a well-known ball nut-type steering device, and has the steering shaft 2 linked to the steering wheel (not shown) and the sector shaft 3 linked to the steered wheels (not shown). These steering shaft 2 and sector shaft 3 are accommodated in a housing 1. The ball nut 4 is interposed between the steering shaft 2 and the sector shaft 3. Rotation of the steering shaft 2 is then converted to rotation of the sector shaft 3 through the ball nut 4.

The housing 1 has a first housing 11, a second housing 12 and a third housing 13. The first housing 11 functions as a housing body that accommodates therein the steering shaft 2, the sector shaft 3 and the ball nut 4. That is, the first housing 11 has a substantially cylindrical steering shaft accommodation part 111 that extends in the rotation axis X direction and accommodates the steering shaft 2 and the ball nut 4 and a substantially cylindrical sector shaft accommodation part 112 that extends in the rotation axis Y direction orthogonal to the rotation axis X and accommodates the sector shaft 3.

As illustrated in FIG. 1, the steering shaft accommodation part 111 has a bottomed cylindrical shape in which one end side in the rotation axis X direction of the steering shaft accommodation part 111 is open to the outside through a first opening 111a, and the other end side of the steering shaft accommodation part 111 is closed by an end wall 111b. The first opening 111a is closed by the second housing 12 that is fitted into the first opening 111a.

The second housing 12 has a cylindrical shape whose outside diameter is reduced stepwise toward the other end side. The second housing 12 has a second housing body 121 that abuts on an end surface of the first opening 111a and a second housing fitting portion 122 whose diameter is reduced stepwise with respect to the second housing body 121 and which is fitted into the first opening 111a. A first seal member S1 that can elastically abut on an inner circumferential surface of the first opening 111a is attached to an outer circumferential side of the second housing fitting portion 122. By this first seal member S1 elastically abutting on the inner circumferential surface of the first opening 111a, liquid tightness of an inside of the steering shaft accommodation part 111 is maintained.

Further, the second housing 12 has a steering shaft insertion hole 123 penetrating a middle portion of the second housing 12. The steering shaft 2 is then inserted in the steering shaft accommodation part 111 from the outside through this steering shaft insertion hole 123. The steering shaft insertion hole 123 is formed so that an inside diameter of the steering shaft insertion hole 123 is reduced stepwise from the one end side toward the other end side. The steering shaft insertion hole 123 has a large diameter hole portion 123a having a relatively large diameter at the one end side and a small diameter hole portion 123b having a relatively small diameter at the other end side. A steering shaft bearing 113 such as a ball bearing is accommodated in the large diameter hole portion 123a of the steering shaft insertion hole 123, and the steering shaft 2 is rotatably supported by this steering shaft bearing 113.

The steering shaft bearing 113 has an inner race 113a formed integrally with a second steering shaft 22, an outer race 113b inserted into the large diameter hole portion 123a and a plurality of ball members 113c interposed between the inner race 113a and the outer race 113b. The outer race 113b is held in a state in which movement of the outer race 113b in an axial direction is restricted by a lock nut 114 screwed into the large diameter hole portion 123a.

As illustrated in FIG. 2, the sector shaft accommodation part 112 is arranged substantially tangentially to the steering shaft accommodation part 111. The sector shaft accommodation part 112 is formed so as to be able to communicate with the steering shaft accommodation part 111 by sharing a part in a circumferential direction of the sector shaft accommodation part 112 with the steering shaft accommodation part 111. One end side in the rotation axis Y direction of the sector shaft accommodation part 112 is open to the outside through a second opening 112a, and the other end side of the sector shaft accommodation part 112 is open to the outside through a third opening 112b.

That is, at the sector shaft accommodation part 112, one end portion of the sector shaft 3 inserted into the sector shaft accommodation part 112 through the third opening 112b faces the outside through the second opening 112a, and is connected to a pitman arm (not shown) outside the housing 1. On the other hand, the third opening 112b is closed by the third housing 13 that is fitted into the third opening 112b after inserting the sector shaft 3 into the sector shaft accommodation part 112 through the third opening 112b.

The third housing 13 has a cylindrical shape whose outside diameter is reduced stepwise toward the one end side. The third housing 13 has a third housing body 131 that abuts on an end surface of the third opening 112b and a third housing fitting portion 132 whose diameter is reduced stepwise with respect to the third housing body 131 and which is fitted into the third opening 112b. A second seal member S2 that can elastically abut on an inner circumferential surface of the third opening 112b is attached to an outer circumferential side of the third housing fitting portion 132. By this second seal member S2 elastically abutting on the inner circumferential surface of the third opening 112b, liquid tightness of an inside of the sector shaft accommodation part 112 is maintained.

Further, the third housing 13 has, at an inner circumferential side of the third housing fitting portion 132, a bottomed cylindrical shaft supporting portion 133 for rotatably supporting the other end portion of the sector shaft 3. The shaft supporting portion 133 has a third housing cylindrical portion 134 being open to the one end side and a third housing end wall 135 closing the other end side of the third housing cylindrical portion 134.

As illustrated in FIG. 1, the steering shaft 2 has a first steering shaft 21 whose one end side is connected to the steering wheel (not shown) and the second steering shaft 22 which is connected to the other end side of the first steering shaft 21 so as to be able to relatively rotate through a torsion bar 23 with a part of the second steering shaft 22 overlapping the first steering shaft 21 in a radial direction. The first steering shaft 21 is connected to the torsion bar 23 through a first pin member 241 that penetrates the other end portion of the first steering shaft 21 in the radial direction. Likewise, the second steering shaft 22 is connected to the torsion bar 23 through a second pin member 242 that penetrates the other end portion of the second steering shaft 22 in the radial direction.

It is noted that the steering shaft 2 could be mechanically connected to the steering wheel (not shown), or may be electrically connected to the steering wheel (not shown) by well-known steer-by-wire, although these drawings are omitted in the present embodiment. Further, the steering shaft 2 can be applied to not only a case where the steering shaft 2 is connected to the steering wheel (not shown) and a steering torque is input to the steering shaft 2 through the steering wheel by manual drive, but also a case where the steering shaft 2 is connected to a motor (not shown) and a steering torque is input to the steering shaft 2 through the motor by automatic drive. The case of the manual drive includes a case where a steering torque is input to the steering shaft 2 from the steering wheel (not shown) and also a steering assist torque is input to the steering shaft 2 from a motor (not shown).

As illustrated in FIG. 2, the sector shaft 3 has a sector shaft portion 31 extending along the rotation axis Y direction that crosses the rotation axis X of the steering shaft 2 at a substantially right angle and a sector gear 32 arranged at the other end portion of the sector shaft portion 31 so as to face the ball nut 4. The sector shaft portion 31 and the sector gear 32 are formed integrally with each other, and when the sector gear 32 rotates, the sector shaft portion 31 also rotates integrally with the sector gear 32.

One end side of the sector shaft portion 31 with respect to the sector gear 32 is formed as a large diameter shaft portion 311 having a relatively large diameter, and the other end side with respect to the sector gear 32 is formed as a small diameter shaft portion 312 having a relatively small diameter. One end side of the large diameter shaft portion 311 is connected to the pitman arm (not shown), and the other end side of the large diameter shaft portion 311 is rotatably supported by a large diameter bearing 331 that is accommodated at an inner circumferential side of the second opening 112*a*. That is, since the large diameter shaft portion 311 provides large torque to the steered wheels (not shown) through the pitman arm (not shown) connected to the one end portion of the large diameter shaft portion 311, the diameter of the large diameter shaft portion 311 is formed relatively large in order to ensure rigidity that can resist the large torque exerted on the large diameter shaft portion 311.

Further, a large diameter seal member 341 that can liquid-tightly seal a gap between an outer circumferential surface of the large diameter shaft portion 311 and an inner circumferential surface of the second opening 112*a* is provided at one end side of the large diameter bearing 331. With this, an outflow of hydraulic fluid filling an inside of the housing 1 (the sector shaft accommodation part 112) to the outside through the second opening 112*a* is suppressed.

On the other hand, the small diameter shaft portion 312 is rotatably supported by a small diameter bearing 332 that is accommodated at an inner circumferential side of the third housing cylindrical portion 134. That is, the small diameter shaft portion 312 is a portion that rotatably supports the other end side of the sector shaft 3, and since large torque like the large torque exerted on the large diameter shaft portion 311 is not exerted on the small diameter shaft portion 312 and there is no need to ensure high rigidity that can resist the large torque, the diameter of the small diameter shaft portion 312 is formed relatively small.

Further, a small diameter seal member 342 that can liquid-tightly seal a gap between an outer circumferential surface of the small diameter shaft portion 312 and an inner circumferential surface of the third housing cylindrical portion 134 is provided at the other end side of the small diameter bearing 332. With this, an outflow of the hydraulic fluid filling the inside of the housing 1 (the sector shaft accommodation part 112) to the outside through an after-described female screw hole 136 is suppressed.

As illustrated in FIGS. 1 and 2, the sector gear 32 has a connection base portion 320 that is provided between the large diameter shaft portion 311 and the small diameter shaft portion 312 and connected to the large diameter shaft portion 311 and the small diameter shaft portion 312, a first sector tooth 321, a second sector tooth 322 and a third sector tooth 323 that are provided at a side portion of the connection base portion 320 so as to face rack teeth 42 of the ball nut 4. The first sector tooth 321 protrudes along a Z-axis direction orthogonal to the rotation axis X and the rotation axis Y in a neutral state of the sector gear 32. The second sector tooth 322 protrudes in a right oblique direction of the first sector tooth 321 toward the one end side of the rotation axis X. The third sector tooth 323 protrudes in a left oblique direction of the first sector tooth 321 toward the other end side of the rotation axis X.

The sector gear 32 is formed as a so-called tapered gear. That is, as depicted in FIG. 2, a first tooth bottom 325 positioned between the first sector tooth 321 and the second sector tooth 322 and a second tooth bottom 326 positioned between the first sector tooth 321 and the third sector tooth 323 are formed so as to have such tapered surfaces that tooth heights T of the first to third sector teeth 321 to 323 gradually increase toward the one end side of the sector shaft 3.

With the configuration of the tapered gear, the female screw hole 136 penetrating the third housing end wall 135 along the rotation axis Y is formed at the third housing end wall 135, and an adjustment screw 5 is screwed into this female screw hole 136 from the other end side of the third housing 13 (from the outside). This adjustment screw 5 is screwed with the adjustment screw being in contact with the other end portion (the small diameter shaft portion 312) of the sector shaft 3, then the adjustment screw 5 moves forward to the one end side and forces the sector shaft 3 to the one end side. That is, by screwing the adjustment screw 5 and moving the sector shaft 3 to the one end side, gaps between the first and second tooth bottoms 325 and 326 and second and third rack teeth 422 and 423 are reduced (become narrow), thereby reducing backlash of the sector gear 32 with respect to the rack teeth 42.

As described above, in the present embodiment, a backlash adjustment mechanism which is configured by the sector gear 32 formed by the tapered gear and the adjustment screw 5 forcing the sector shaft 3 and which can adjust the backlash between the sector gear 32 and the rack teeth 42 by manual operation of rotation (screwing) of the adjustment screw 5 is provided. With this backlash adjustment mechanism, when maintaining or servicing a vehicle, it is possible to adjust the backlash between the sector gear 32 and the rack teeth 42 which increases due to wear etc. of the sector gear 32 and the rack teeth 42.

As illustrated in FIGS. 1 and 2, the ball nut 4 is cylindrical in shape, and a shaft hole 41 is formed at the ball nut 4 along the rotation axis X direction. That is, the ball nut 4 is provided so as to be able to move forward and backward (or upward and downward) in the rotation axis X direction through a plurality of balls 43 interposed between a shaft-side ball groove 401 that is provided at an outer circumferential side of the second steering shaft 22 accommodated in the steering shaft accommodation part 111 and a nut-side ball groove 402 that is provided at an inner circumferential side (in the shaft hole 41) of the ball nut 4. At an outside portion of the ball nut 4 in the rotation axis X direction, the rack teeth 42 (after-described first to fourth rack teeth 421 to 424) that are engaged with the sector gear 32 are formed in a predetermined range facing the sector gear 32. Further, at the outside portion of the ball nut 4 in the rotation axis X direction, a cylindrical tube member 44 connecting one end side and the other end side of the nut-side ball groove 402 for circulating the plurality of balls 43 is arranged on a back surface side of the rack teeth 42, i.e. on an opposite side to the rack teeth 42 with respect to the rotation axis X.

As illustrated in FIG. 1, the rack teeth 42 has the first rack tooth 421, the second rack tooth 422, the third rack tooth 423 and the fourth rack tooth 424 that are arranged parallel to each other along the rotation axis X direction at the side portion of the ball nut 4 which faces the sector gear 32. Between the second rack tooth 422 and the third rack tooth 423, a first rack tooth bottom 425 which is a specific tooth bottom facing the first sector tooth 321 which is a central tooth is formed. Between the first rack tooth 421 and the second rack tooth 422, a second rack tooth bottom 426 which faces the second sector tooth 322 is formed. Between the third rack tooth 423 and the fourth rack tooth 424, a third rack tooth bottom 427 which faces the third sector tooth 323 is formed.

The ball nut 4 functions as a piston of a power cylinder operated by hydraulic pressure of hydraulic fluid filling an inside of the steering shaft accommodation part 111, and is slidably provided in the steering shaft accommodation part 111. That is, at the inside of the steering shaft accommodation part 111, two hydraulic chambers, i.e. a first hydraulic chamber P1 and a second hydraulic chamber P2 which face each other in the rotation axis X direction with respect to the ball nut 4, are defined by the ball nut 4. The second hydraulic chamber P2 is formed so as to be able to communicate with the sector shaft accommodation part 112 via a communication hole 115 provided at the first housing 11. The hydraulic fluid in the second hydraulic chamber P2 is introduced into the sector shaft accommodation part 112, thereby lubricating the sector gear 32 and the rack teeth 42 (the gaps between the sector gear 32 and the rack teeth 42).

Further, a well-known rotary valve RV as a control valve that can selectively provide the hydraulic fluid, which is supplied by a hydraulic pressure source (e.g. a pump) (not shown) according to a relative rotation of the first steering shaft 21 and the second steering shaft 22, to the first hydraulic chamber P1 or the second hydraulic chamber P2 of the power cylinder is configured at an inside of the second housing 12. The rotary valve RV has a rotor 210 formed integrally with the other end portion of the first steering shaft 21 and a sleeve 220 provided at an outer circumferential side of the rotor 210 and formed integrally with one end portion of the second steering shaft 22.

At an inner circumferential side of the second housing 12, an introduction port 124a, a supply port 124b and a discharge port 124c as circumferential direction grooves extending along a circumferential direction of the rotation axis X are arranged parallel to each other in the rotation axis X direction. Further, an introduction passage 124d connecting an introduction pipe (not shown) and the introduction port 124a and a discharge passage 124e connecting the discharge port 124c and a discharge pipe (not shown) are provided at the inside of the second housing 12. Also, at the insides of the first housing 11 and the second housing 12, a supply passage L connecting the supply port 124b and the first hydraulic chamber P1 is formed so as to span the first housing 11 and the second housing 12. More specifically, the supply passage L is configured by a first housing supply passage 116 provided at the inside of the first housing 11 and a second housing supply passage 126 provided at the inside of the second housing 12 and connecting the supply port 124b and the first housing supply passage 116. The introduction port 124a is connected to the hydraulic pressure source (not shown) via the introduction passage 124d and the introduction pipe (not shown). The supply port 124b is connected to the first hydraulic chamber P1 via the supply passage L. The discharge port 124c is connected to a reservoir tank (not shown) via the discharge passage 124e and the discharge pipe (not shown).

At an outer circumferential side of the rotor 210, supply recessed portions 210a and discharge recessed portions (not shown) each extending in a vertical groove shape along the rotation axis X direction are alternately arranged parallel to each other in the circumferential direction. Likewise, at an inner circumferential side of the sleeve 220, right steering recessed portions 220a and left steering recessed portions (not shown) each extending in a vertical groove shape along the rotation axis X direction are alternately arranged parallel to each other in the circumferential direction. The sleeve 220 is provided with a first communication passage 221, a second communication passage 222, a supply communication passage 223 and a discharge communication passage 224 so that these passages communicate with an inner circumference and an outer circumference of the sleeve 220. The first communication passage 221 is open to the right steering recessed portions 220a. The second communication passage 222 is open to the left steering recessed portions (not shown). The supply communication passage 223 or the discharge communication passage 224 is open to protruding portions (not shown) arranged between the right steering recessed portions 220a and the left steering recessed portions (not shown) in the circumferential direction, and these supply communication passage 223 and discharge communication passage 224 are alternately arranged in the circumferential direction.

As illustrated in FIGS. 1 and 2, a preload applying mechanism 6 that adjusts engagement between the sector gear 32 and the rack teeth 42 in the vicinity of a neutral position (a position shown in FIG. 1) of the sector shaft 3 which corresponds to a straight-ahead steering state is provided between the sector gear 32 and the rack teeth 42. In the present embodiment, as depicted in FIGS. 1 and 2, a case where the preload applying mechanism 6 is disposed at the ball nut 4 side will be described. Particularly as depicted in FIG. 2, the preload applying mechanism 6 according to the present embodiment is provided at a position of one end side in a tooth width direction of the first rack tooth bottom 425 as the specific tooth bottom engaged with the first sector tooth 321 as the central tooth and at a position of a side facing one end side of the first sector tooth 321 close to the large diameter shaft portion 311.

(Configuration of Preload Applying Mechanism)

Figure 3:
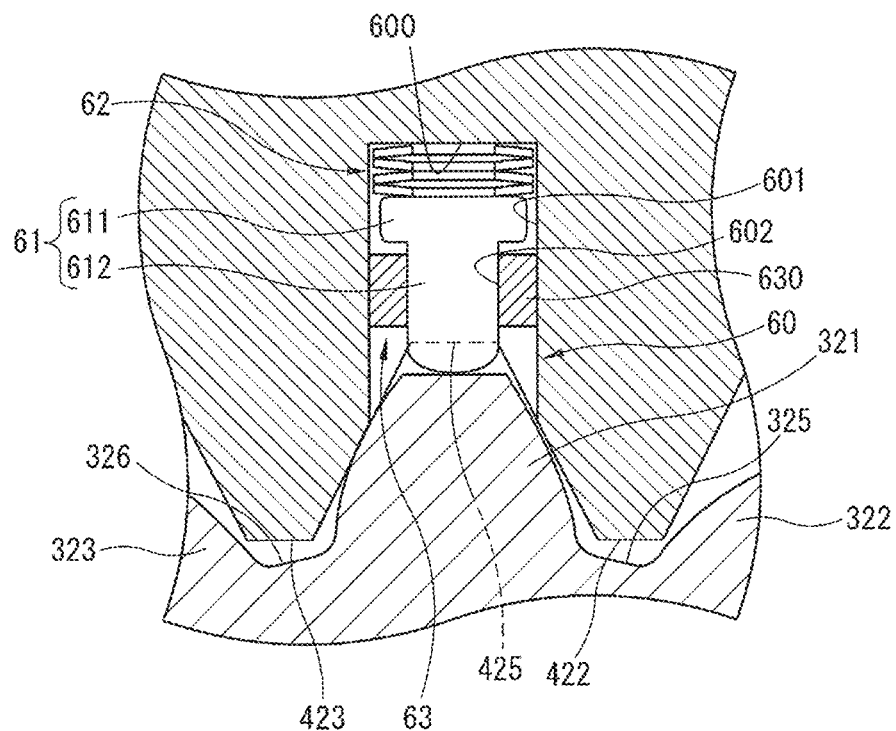
FIG. 3 is an enlarged view of a main part of FIG. 1.

FIG. 3 shows an enlarged view of the preload applying mechanism 6, which is a main part of FIG. 1, and its vicinity.

As illustrated in FIG. 3, the preload applying mechanism 6 has a plunger receiving hole 60 formed at the first rack tooth bottom 425, a plunger 61 accommodated in the plunger receiving hole 60 so as to be able to move forward and backward and a forcing member 62 interposed between a bottom of the plunger receiving hole 60 and a bottom of the plunger 61 and forcing the plunger 61 toward the first sector tooth 321.

The plunger receiving hole 60 has a substantially circular cross section. One end of the plunger receiving hole 60 is open to the first rack tooth bottom 425, and the other end is closed by a bottom wall 600. The plunger receiving hole 60 is a round hole (or a circular hole) having a constant inside diameter in an axial direction. A ring-shaped annular member 63 is press-fitted into the plunger receiving hole 60 from the opening side.

Therefore, the plunger receiving hole 60 is formed into a tapered stepped diameter shape. That is, the plunger receiving hole 60 has a large diameter hole portion 601 provided at the bottom wall 600 side and having a relatively large diameter and a small diameter hole portion 602 provided at the opening side and formed at an inner circumferential side of the annular member 63 and having a relatively small diameter. Between the large diameter hole portion 601 and the small diameter hole portion 602, a stopper 630 that restricts a forward-moving amount of the plunger 61, i.e. a protruding amount of the plunger 61 protruding from the small diameter hole portion 602, by coming into contact with a large diameter portion 611 of the plunger 61 is formed by the annular member 63.

Figure 4A:
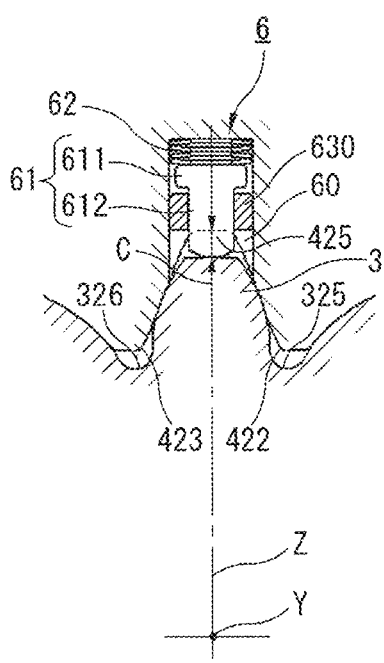
FIGS. 4A to 4C are drawings showing change of a protruding amount of a plunger according to a steering state.

In a state in which a rotation phase of the sector shaft 3 is in the vicinity of the neutral position, the stopper 630 does not come into contact with the plunger large diameter portion 611 (does not abut on the plunger large diameter portion 611), and allows contact of the plunger 61 with the first sector tooth 321 (allows the plunger 61 to abut on the first sector tooth 321) (see FIG. 4A). On the other hand, in a state in which the rotation phase of the sector shaft 3 exceeds the vicinity of the neutral position, the stopper 630 comes into contact with the plunger large diameter portion 611, and restricts the contact of the plunger 61 with the first sector tooth 321 (see FIG. 4C).

The plunger 61 is formed as a single-piece member with resin material, and formed into a tapered shape whose outside diameter is reduced stepwise toward its top end. More specifically, the plunger 61 has the plunger large diameter portion 611 received and accommodated in the large diameter hole portion 601 of the plunger receiving hole 60 and a plunger small diameter portion 612 slidably provided in the small diameter hole portion 602 of the plunger receiving hole 60. The plunger large diameter portion 611 faces the bottom wall 600 of the plunger receiving hole 60, and functions as a seating surface of the forcing member 62. On the other hand, the plunger small diameter portion 612 protrudes from the small diameter hole portion 602 of the plunger receiving hole 60 and faces the outside, and faces the first sector tooth 321. A top end portion of the plunger small diameter portion 612 has a gentle curved surface, and when the sector shaft 3 rotates, the top end portion of the plunger small diameter portion 612 can smoothly come into sliding-contract with a tooth surface of the first sector tooth 321.

One end portion of the forcing member 62 is seated on the bottom wall 600 of the plunger receiving hole 60, and the other end is seated on the plunger large diameter portion 611, then the forcing member 62 is accommodated between the bottom wall 600 of the plunger receiving hole 60 and the plunger large diameter portion 611 with a predetermined pressurization given to the forcing member 62. That is, the forcing member 62 is given the predetermined pressurization so that even when the plunger large diameter portion 611 abuts on the stopper 630, a forcing force of the forcing member 62 acts on the plunger 61. The forcing member 62 then constantly applies the forcing force to the plunger 61. In the present embodiment, the forcing member 62 is configured by stacking a plurality of well-known disc springs in series. It is noted that the forcing member 62 is not limited to the plurality of stacked disc springs like the present embodiment. As long as a forcing member such as a coil spring can continuously force the plunger 61, its material and shape or form can be arbitrarily changed.

(Description of Working of Preload Applying Mechanism)

Figure 4B:
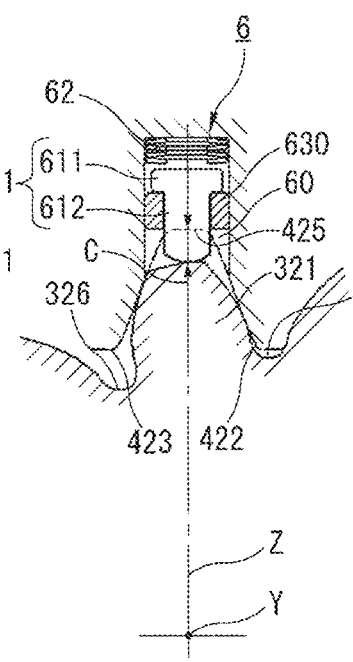
Figure 4C:
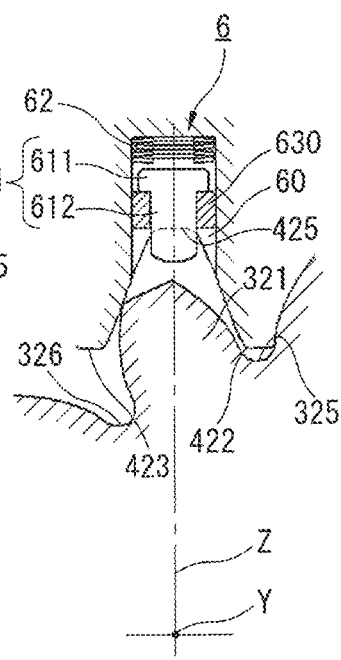

FIGS. 4A to 4C are drawings showing change of the protruding amount of the plunger 61 according to a steering state. FIG. 4A is the neutral state in which a steering angle is 0 degree. FIG. 4B is a steering state in which the steering angle 12 degrees. FIG. 4C is a steering state in which the steering angle 25 degrees.

As illustrated in FIG. 4A, in the neutral state in which the steering angle is 0 degree, the plunger 61 is in a retracted state, the plunger large diameter portion 611 separates from the stopper 630, and a top end surface of the plunger small diameter portion 612 elastically abuts on a tooth tip of the first sector tooth 321 by the forcing force of the forcing member 62. In this state, by a reaction force generated by the elastic abutting of the plunger 61 on the tooth tip of the first sector tooth 321, the ball nut 4 is forced to one side in the rotation direction of the ball nut 4. As a result, at the other end side of the sector gear 32, a gap C between the first sector tooth 321 and the first rack tooth bottom 425 is reduced. With this, engagement (or mesh) between the first sector tooth 321 and the second and third rack teeth 422, 423 becomes deeper, then backlash between the first sector tooth 321 and the second and third rack teeth 422, 423 is reduced.

As illustrated in FIG. 4B, in the steering state in which the steering angle 12 degrees, the plunger 61 is in a forward-moving state, the plunger large diameter portion 611 is in a state immediately before coming into contact with the stopper 630, and the top end (a tip) of the plunger small diameter portion 612 elastically abuts on the tooth tip of the first sector tooth 321 by the forcing force of the forcing member 62. In this state, as compared with the neutral state, a relatively small forcing force due to extension of the forcing member 62 by the forward-movement of the plunger 61 acts on the plunger 61. That is, by a reaction force generated by elastic abutting of the plunger 61 on the tooth tip of the first sector tooth 321 by the forcing force that is smaller than that of the neutral state, the ball nut 4 is forced to the one side in the rotation direction of the ball nut 4. As a result, at the other end side of the sector gear 32, the gap C between the first sector tooth 321 and the first rack tooth bottom 425 is reduced, then backlash between the first sector tooth 321 and the second and third rack teeth 422, 423 is reduced.

As illustrated in FIG. 4C, in the steering state in which the steering angle 25 degrees, the plunger 61 is in the most forward-moving state, the plunger large diameter portion 611 abuts on the stopper 630 and the forward-movement of the plunger 61 is restricted, and the top end of the plunger small diameter portion 612 separates from the tooth tip of the first sector tooth 321. In this state, since the forcing force does not act on the ball nut 4, the gap C between the first sector tooth 321 and the first rack tooth bottom 425 does not change, and backlash between the first sector tooth 321 and the second and third rack teeth 422, 423 is not adjusted.

Working and Effect of the Present Embodiment

In the conventional steering device, the plunger provided at the inside of the ball nut so as to be able to be forced toward the sector gear elastically abuts on the plunger sliding-contact portion provided adjacent to the sector gear and having the predetermined cam profile, and by the reaction force from the plunger sliding-contact portion generated by this elastic contact (elastic abutment), the ball nut is forced to the one side in the rotation direction, then the preload applying mechanism reduces backlash between the rack teeth and the sector gear in the vicinity of the neutral position of the sector shaft. However, in the case of the conventional steering device, it is necessary to provide the plunger sliding-contact portion separately from the sector gear. Because of this, there is still room for improvement in that a size of the sector shaft in the axial direction is increased by a size of the plunger sliding-contact portion.

In contrast to this, the steering device PS1 according to the present embodiment has: the rack teeth 42 formed at the outer side of the ball nut 4 screwed onto the steering shaft 2 (the second steering shaft 22) linked to the steering wheel (not shown); the sector gear 32 provided at the sector shaft 3 linked to the steered wheels (not shown) and having the plurality of sector teeth (the first sector tooth 321, the second sector tooth 322 and the third sector tooth 323) including the central tooth (the first sector tooth 321) most deeply engaged (or meshed) with the rack teeth 42 in the neutral position state of the sector shaft 3 which corresponds to the straight-ahead steering state, which are provided in the circumferential direction of the sector shaft 3 and which are engaged (or meshed) with the rack teeth 42 (the sector gear 32 is engaged with the rack teeth 42 by the plurality of sector teeth (321, 322 and 323) including the central tooth (321)); and the preload applying mechanism 6 adjusting engagement between the rack teeth 42 and the sector gear 32 in the vicinity of the neutral position of the sector shaft 3. The preload applying mechanism 6 is provided at the one end portion in the tooth width direction of the specific tooth bottom (the first rack tooth bottom 425) of the rack teeth 42, which faces the tooth tip of the central tooth (the first sector tooth 321) when the sector shaft 3 is in the vicinity of the neutral position. The preload applying mechanism 6 forces the ball nut 4 to the one side in the rotation direction of the ball nut 4 by the reaction force generated by the elastic contact of the preload applying mechanism 6 with the tooth tip of the central tooth (the first sector tooth 321).

As described above, the present embodiment is configured to provide a rotation torque to the one side in the rotation direction of the ball nut 4 by the reaction force generated by the elastic contact (elastic abutment) of the plunger 61 with (on) the tooth tip of the first sector tooth 321 of the sector gear 32. Therefore, in the present embodiment, unlike the conventional steering device, there is no need to provide a pressed portion to be pressed by the plunger 61 separately from the sector gear 32. Increase in size of the sector shaft 3 due to formation of the pressed portion can therefore be suppressed.

Further, in the present embodiment, the preload applying mechanism 6 has the plunger receiving hole 60 formed at the specific tooth bottom (the first rack tooth bottom 425), the plunger 61 which is accommodated in the plunger receiving hole 60 so as to be able to move forward and backward and whose top end side can protrude from the opening, which faces the sector gear 32, of the plunger receiving hole 60, and the forcing member 62 interposed between the bottom (the bottom wall 600) of the plunger receiving hole 60 and the plunger 61 and forcing the plunger 61 toward the central tooth (the first sector tooth 321).

That is, in the present embodiment, the preload applying mechanism 6 is configured by only the plunger receiving hole 60 formed at the ball nut 4, the forcing member 62 and the plunger 61 both accommodated in the plunger receiving hole 60. Then, by pressing the tooth tip of the first sector tooth 321 of the sector gear 32 by the plunger 61, the rotation torque to the ball nut 4 is generated.

As described above, in the present embodiment, the preload applying mechanism 6 has a simple configuration formed by only the plunger 61, the forcing member 62 and the plunger receiving hole 60 accommodating therein these plunger 61 and forcing member 62. Therefore, in the present embodiment, unlike the conventional steering device, there is no need to process (machine) or form the pressed portion of the plunger 61. The preload applying mechanism 6 can therefore be configured at a relatively low cost, thereby reducing a manufacturing cost of the steering device PS1.

Also, in the present embodiment, the plunger 61 has the large diameter portion (the plunger large diameter portion 611) sliding in the plunger receiving hole 60, and the small diameter portion (the plunger small diameter portion 612) whose diameter is reduced stepwise with respect to the large diameter portion (the plunger large diameter portion 611) and which can protrude from the opening of the plunger receiving hole 60. The plunger receiving hole 60 has the stopper 630 which is formed by reducing an inside diameter of the opening to be smaller than the outside diameter of the large diameter portion (the plunger large diameter portion 611) and which restricts the protruding amount of the small diameter portion (the plunger small diameter portion 612) by coming into contact with the large diameter portion (the plunger large diameter portion 611). In the state in which the rotation phase of the sector shaft 3 is in the vicinity of the neutral position, the large diameter portion (the plunger large diameter portion 611) does not come into contact with the stopper 630, and contact of the plunger 61 with the central tooth (the first sector tooth 321) is allowed. On the other hand, in the state in which the rotation phase of the sector shaft 3 exceeds the vicinity of the neutral position, the large diameter portion (the plunger large diameter portion 611) comes into contact with the stopper 630, and the contact of the plunger 61 with the central tooth (the first sector tooth 321) is restricted.

That is, the present embodiment is configured so that when the rotation phase of the sector shaft 3 is in the vicinity of the neutral position of the steering, the contact of the plunger 61 with the first sector tooth 321 is allowed, whereas when the rotation phase of the sector shaft 3 exceeds the vicinity of the neutral position, the contact of the plunger 61 with the first sector tooth 321 is restricted by the stopper 630.

As described above, in the present embodiment, by restricting the protruding amount of the plunger 61 by the stopper 630, only in the vicinity of the neutral position of the sector shaft 3 which requires rigidity, the engagement between the rack teeth 42 and the sector gear 32 can be adjusted. In other words, except when the sector shaft 3 is in the vicinity of the neutral position which does not particularly require the rigidity, by restricting the contact of the plunger 61 with the first sector tooth 321, deterioration of steering feeling, such as so-called grinding feeling caused by sliding-contact of the plunger 61 with the first sector tooth 321, can be suppressed.

In the present embodiment, the stopper 630 is structured only by narrowing the opening of the plunger receiving hole 60 by the annular member 63. Therefore, in the present embodiment, unlike the conventional steering device, it is possible to restrict the protruding amount of the plunger 61 by the relatively simple structure without forming the complicated or sophisticate cam profile, which can contribute to reduction in the manufacturing cost of the steering device PS1.

Further, in the present embodiment, the tooth bottom (the first tooth bottom 325 and the second tooth bottom 326) of the sector gear 32 has such tapered surface that the tooth height T of the sector gear 32 gradually increases toward the one end side in the axial direction of the sector shaft 3. The sector shaft 3 is configured to be movable to the one end side in the axial direction of the sector shaft 3 by the adjustment screw 5 screwed from the other end side in the axial direction of the sector shaft 3 through the female screw hole 136 formed at the end wall (the third housing 13) of the housing 1 (the first housing 11) accommodating therein the sector shaft 3.

As described above, in the present embodiment, the sector gear 32 has the tapered gear shape in which the first tooth bottom 325 and the second tooth bottom 326 of the sector gear 32 are the tapered surfaces, and by moving the sector shaft 3 to the one end side in the axial direction by the adjustment screw 5, the engagement between the rack teeth 42 and the sector gear 32 can be adjusted. With this, not only in the vicinity of the neutral position of the sector shaft 3, but also in the entire rotation range of the sector shaft 3, proper engagement between the rack teeth 42 and the sector gear 32 can be ensured.

Modified Example

Figure 5:
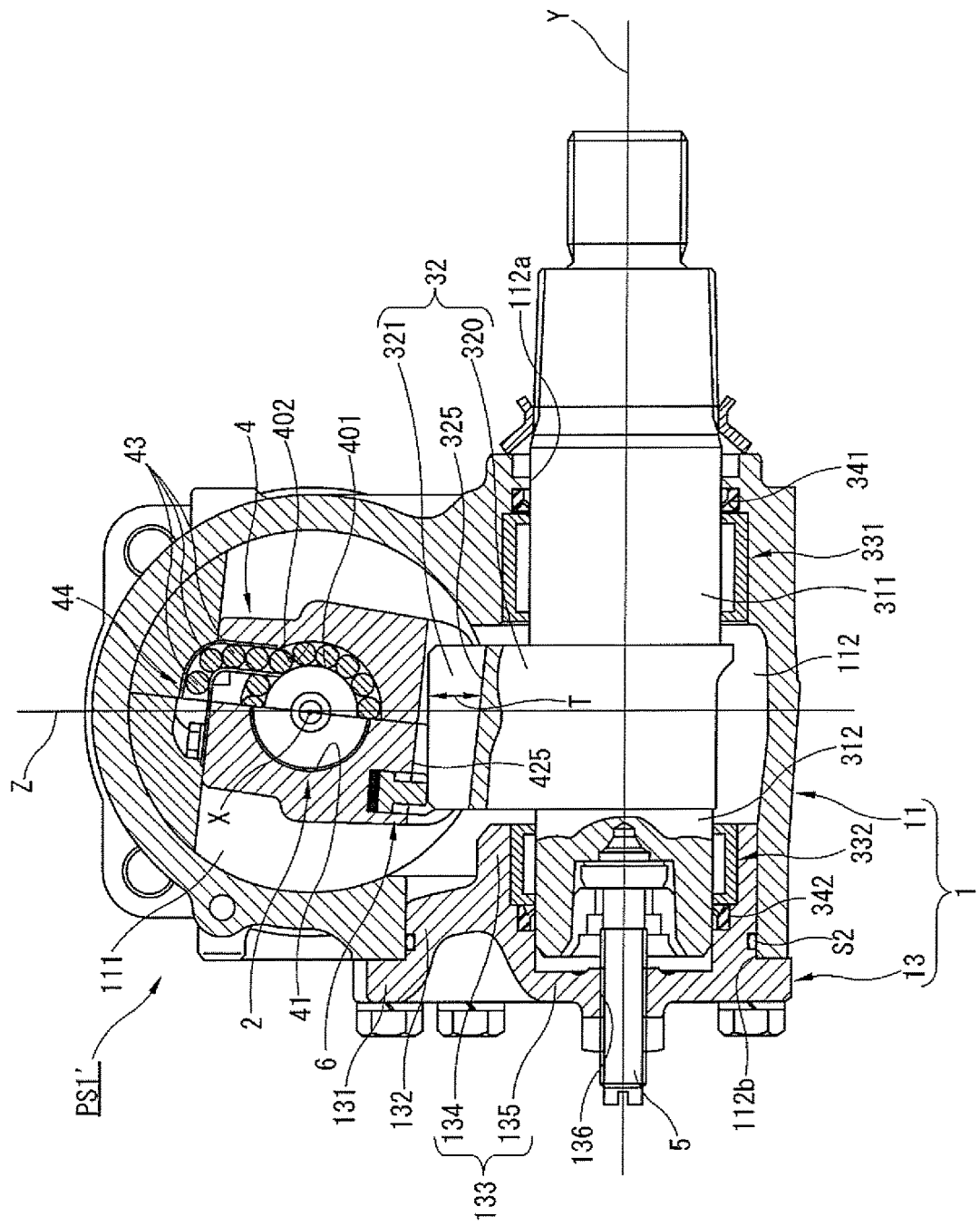
FIG. 5 is a modified example of the first embodiment of the steering device according to the present invention, and shows a cross section of the steering device, which corresponds to the sectional view taken along the plane A-A of FIG. 1.

FIG. 5 is a modified example of the first embodiment of the present invention. In this modified example, arrangement of the preload applying mechanism 6 of the first embodiment is changed, but the other configuration is the same as that of the first embodiment. Therefore, the same structure or configuration as that of the first embodiment is denoted by the same reference sign, and its detailed description is omitted here.

FIG. 5 is a steering device PS1' according to the modified example of the first embodiment of the present invention, showing a cross section of the steering device PS1', which corresponds to the sectional view taken along the plane A-A of FIG. 1.

As illustrated in FIG. 5, in the steering device PS1' according to the modified example, the plunger receiving hole 60 is provided at a position of the other end side in the tooth width direction of the first rack tooth bottom 425, and the plunger 61 is provided at a position of a side facing the other end side of the first sector tooth 321 close to the small diameter shaft portion 312.

With this configuration, in the preload applying mechanism 6 of the steering device PS1' according to the modified example, in the vicinity of the neutral position of the sector shaft 3, the plunger 61 arranged at the other end side in the tooth width direction of the first rack tooth bottom 425 elastically abuts on the tooth tip of the first sector tooth 321 of the sector gear 32 by the forcing force of the forcing member 62. In this state, by a reaction force generated by the elastic abutting of the plunger 61 on the first sector tooth 321 by the forcing force of the forcing member 62, the ball nut 4 is forced to the other side in the rotation direction of the ball nut 4. As a result, at the one end side of the sector gear 32, a gap C between the first sector tooth 321 and the first rack tooth bottom 425 is reduced, then backlash between the first sector tooth 321 and the second and third rack teeth 422, 423 is reduced.

As described above, in the steering device PS1' according to the modified example, one end side in the axial direction of the sector shaft 3 with respect to the sector gear 32, which is the side connected to the pitman arm (not shown), is formed so as to have a relatively large diameter, and the other end side in the axial direction of the sector shaft 3 with respect to the sector gear 32 is formed so as to have a relatively small diameter as compared with that of the one end side in the axial direction of the sector shaft 3. The plunger receiving hole 60 is provided at one of the both end portions in the tooth width direction of the specific tooth bottom (the first rack tooth bottom 425), which corresponds to the other end side in the axial direction of the sector shaft 3.

That is, in the present modified example, the plunger receiving hole 60 forming the preload applying mechanism 6 is arranged at the small diameter shaft portion 312 side where the diameter of the sector shaft 3 is relatively small. Therefore, a space in which the preload applying mechanism 6 can be arranged is expanded by a space equivalent to the reduction in diameter of the sector shaft portion 31 like the small diameter shaft portion 312, and the preload applying mechanism 6 can be arranged at a position farther away from a rotation center of the ball nut 4. With this, a greater rotation torque can be provided to the ball nut 4, thereby adjusting the engagement between the first sector tooth 321 and the second and third rack teeth 422, 423 more effectively.

Second Embodiment

Figure 6:
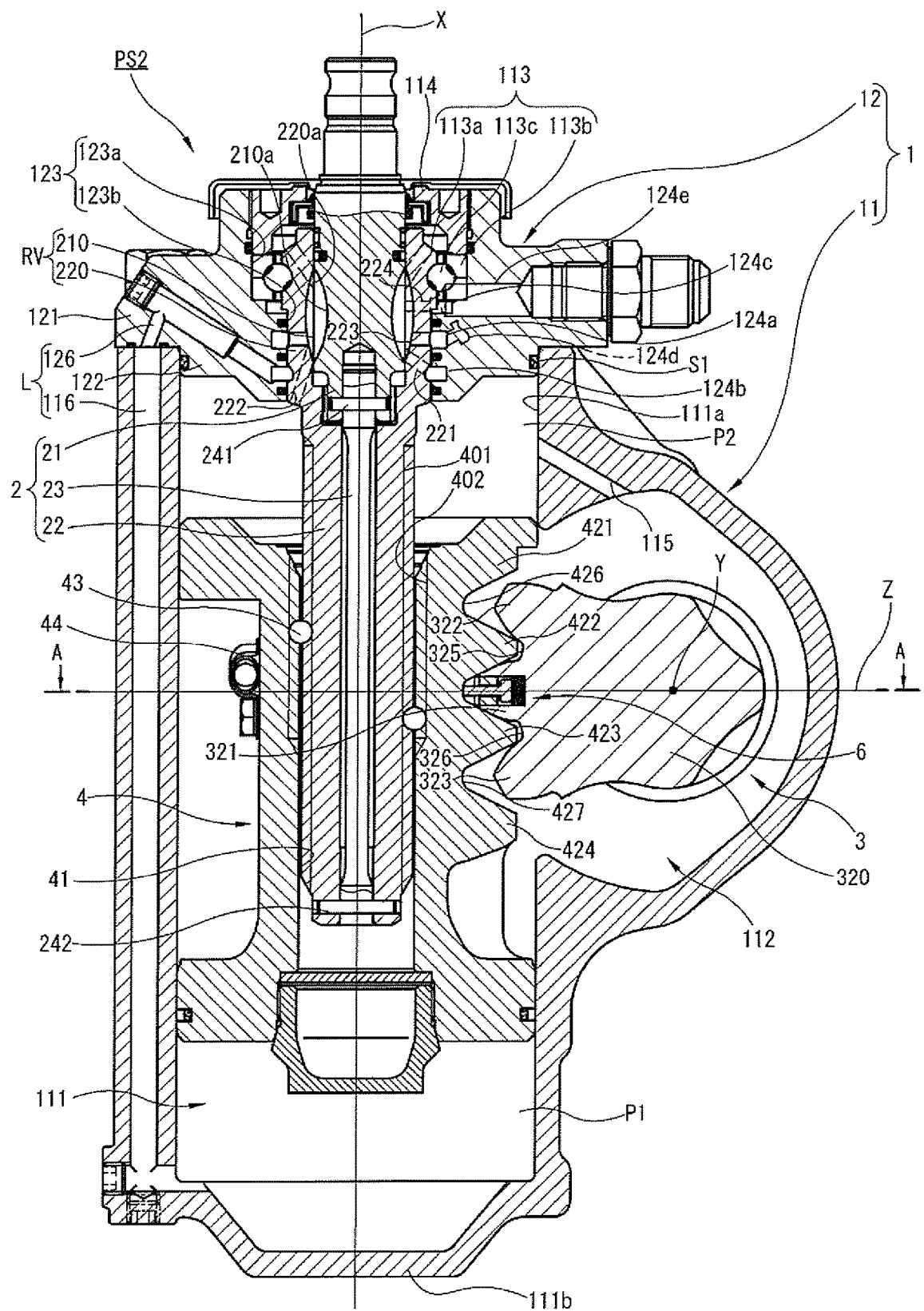
FIG. 6 is a longitudinal cross section of a steering device according to a second embodiment of the present invention.
Figure 7:
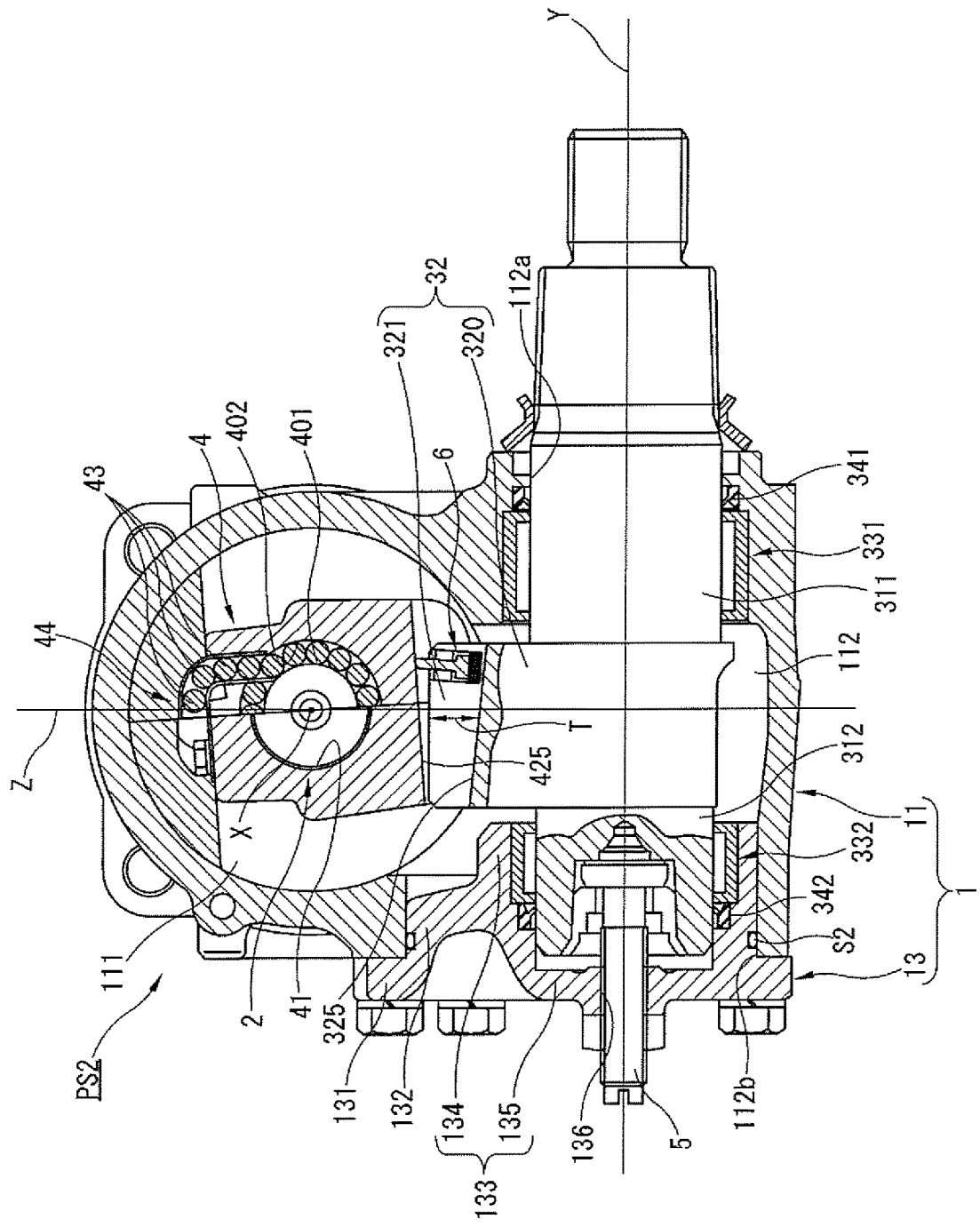
FIG. 7 is a sectional view taken along a plane A-A of FIG. 6.
Figure 8:
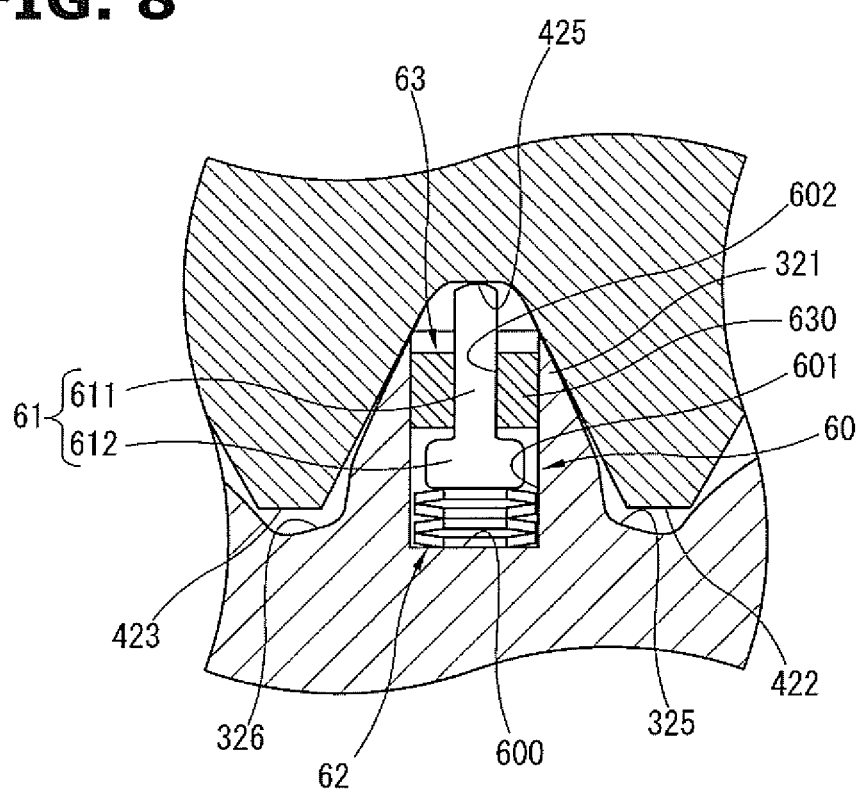
FIG. 8 is an enlarged view of a main part of FIG. 6.

FIGS. 6 to 8 show a second embodiment of the steering device according to the present invention. In the present embodiment, arrangement of the preload applying mechanism 6 of the first embodiment is changed, but the other configuration is the same as that of the first embodiment. Therefore, the same structure or configuration as that of the first embodiment is denoted by the same reference sign, and its detailed description is omitted here.

FIG. 6 is the second embodiment of the steering device according to the present invention, showing a longitudinal cross section of the steering device PS2 cut along the rotation center of the steering shaft 2. FIG. 7 shows a cross section of the steering device PS2 cut along a plane A-A of FIG. 6. FIG. 8 shows an enlarged view of the preload applying mechanism 6, which is a main part of FIG. 6, and its vicinity.

As illustrated in FIGS. 6 to 8, in the steering device PS2 according to the present embodiment, the preload applying mechanism 6 is provided not on the rack teeth 42 side like the first embodiment, but on the sector gear 32 side. More specifically, the plunger receiving hole 60 of the preload applying mechanism 6 according to the present embodiment is provided at the tooth tip of one end portion (an end portion close to the large diameter shaft portion 311) in a tooth width direction of the first sector tooth 321 as the central tooth. The preload applying mechanism 6 is then configured so that in the vicinity of the neutral position of the sector shaft 3, the plunger 61 forced by the forcing force of the forcing member 62 can elastically abut on the one end side in the tooth width direction of the first rack tooth bottom 425.

With such configuration, in the preload applying mechanism 6 of the steering device PS2 according to the present embodiment, in the vicinity of the neutral position of the sector shaft 3, the plunger 61 arranged at the one end side in the tooth width direction of the first sector tooth 321 elastically abuts on the first rack tooth bottom 425 by the forcing force of the forcing member 62. In this state, by a forcing force generated by the elastic abutting of the plunger 61 on the first rack tooth bottom 425 by the forcing force of the forcing member 62, the ball nut 4 is forced to the one side in the rotation direction of the ball nut 4. As a result, at the other end side of the sector gear 32, a gap C between the first sector tooth 321 and the first rack tooth bottom 425 is reduced, then backlash between the first sector tooth 321 and the second and third rack teeth 422, 423 is reduced.

As described above, in the steering device PS2 according to the present embodiment, in particular, the preload applying mechanism 6 is provided at the one end portion in the tooth width direction of the central tooth (the first sector tooth 321), and by the forcing force generated by the elastic abutment on (the elastic contact with) the specific tooth bottom (the first rack tooth bottom 425) of the rack teeth 42 which faces the tooth tip of the central tooth (the first sector tooth 321) in the vicinity of the neutral position of the sector shaft 3, the ball nut 4 is forced to the one side in the rotation direction of the ball nut 4.

Therefore, also in the present embodiment, in the same manner as the first embodiment, a rotation torque can be provided to the one side in the rotation direction of the ball nut 4 by the forcing force generated by the elastic contact (elastic abutment) of the plunger 61 with (on) the first rack tooth bottom 425. Thus, unlike the conventional steering device, there is no need to provide a pressed portion to be pressed by the plunger 61 separately from the sector gear 32. As a result, increase in size of the sector shaft 3 due to formation of the pressed portion can be suppressed.

Modified Example

Figure 9:
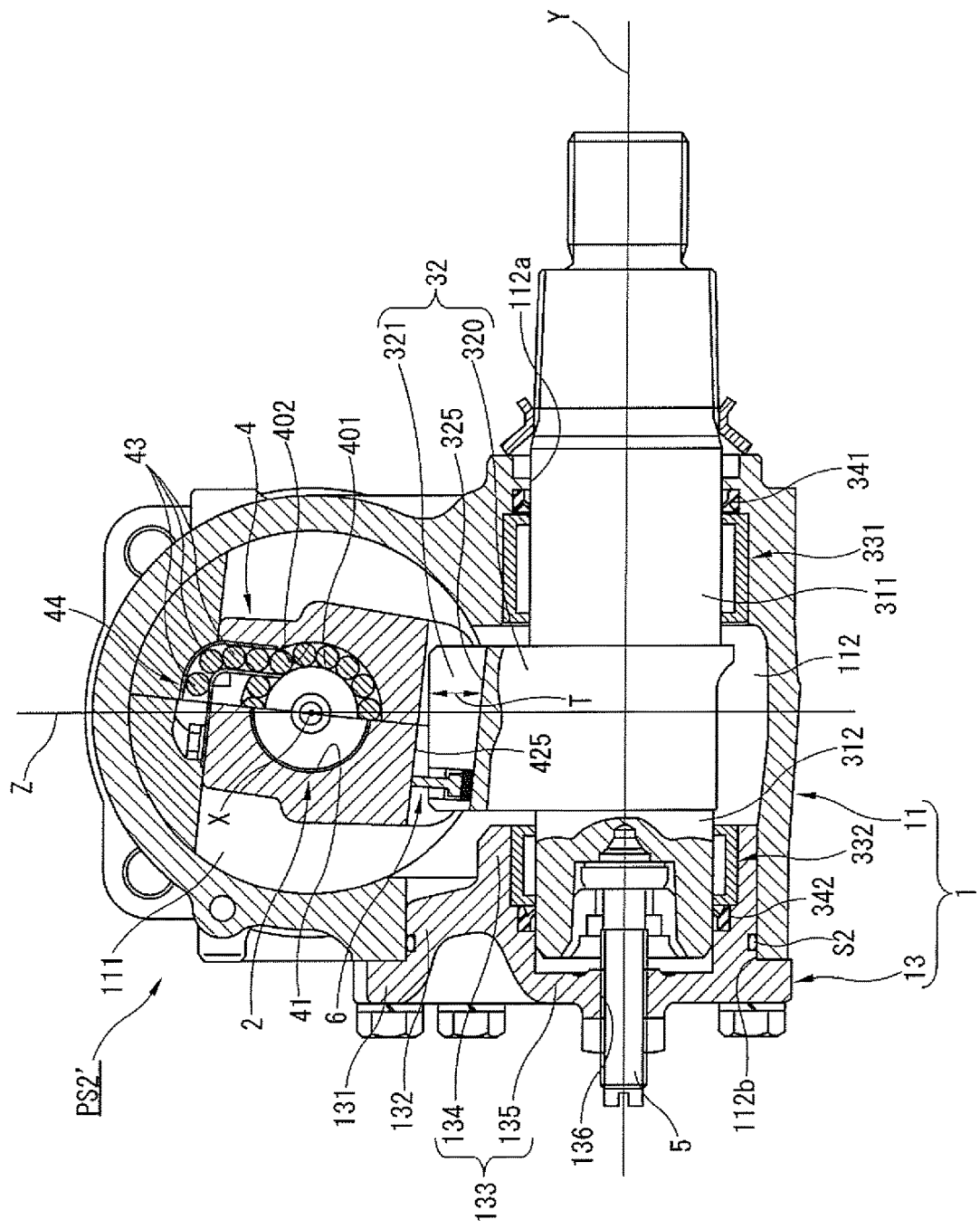
FIG. 9 is a modified example of the second embodiment of the steering device according to the present invention, and shows a cross section of the steering device, which corresponds to the sectional view taken along the plane A-A of FIG. 6.

FIG. 9 is a modified example of the second embodiment of the present invention. In this modified example, arrangement of the preload applying mechanism 6 of the second embodiment is changed, but the other configuration is the same as that of the second embodiment. Therefore, the same structure or configuration as that of the second embodiment is denoted by the same reference sign, and its detailed description is omitted here.

FIG. 9 is a steering device PS2' according to the modified example of the second embodiment of the present invention, showing a cross section of the steering device PS2', which corresponds to the sectional view taken along the plane A-A of FIG. 6.

As illustrated in FIG. 9, in the steering device PS2' according to the modified example, the plunger receiving hole 60 is provided at a position of the other end side in the tooth width direction of the first sector tooth 321, and the preload applying mechanism 6 is provided at a position of a side facing the other end side of the first rack tooth bottom 425 close to the small diameter shaft portion 312.

With such configuration, in the preload applying mechanism 6 of the steering device PS2' according to the present embodiment, in the vicinity of the neutral position of the sector shaft 3, the plunger 61 arranged at the other end side in the tooth width direction of the first sector tooth 321 elastically abuts on the first rack tooth bottom 425 by the forcing force of the forcing member 62. In this state, by a forcing force generated by the elastic abutting of the plunger 61 on the first rack tooth bottom 425 by the forcing force of the forcing member 62, the ball nut 4 is forced to the other side in the rotation direction of the ball nut 4. As a result, at the one end side of the sector gear 32, a gap C between the first sector tooth 321 and the first rack tooth bottom 425 is reduced, then backlash between the first sector tooth 321 and the second and third rack teeth 422, 423 is reduced.

As described above, in the steering device PS2' according to the modified example, one end side in the axial direction of the sector shaft 3 with respect to the sector gear 32, which is the side connected to the pitman arm (not shown), is formed so as to have a relatively large diameter, whereas the other end side in the axial direction of the sector shaft 3 with respect to the sector gear 32 is formed so as to have a relatively small diameter as compared with that of the one end side in the axial direction of the sector shaft 3. The plunger receiving hole 60 is provided at one of the both end portions in the tooth width direction of the central tooth (the first sector tooth 321), which corresponds to the other end side in the axial direction of the sector shaft 3.

That is, in the present modified example, the plunger receiving hole 60 forming the preload applying mechanism 6 is arranged at the small diameter shaft portion 312 side where the diameter of the sector shaft 3 is relatively small. Therefore, a space in which the preload applying mechanism 6 can be arranged is expanded by a space equivalent to the reduction in diameter of the sector shaft portion 31 like the small diameter shaft portion 312, and the preload applying mechanism 6 can be arranged at a position farther away from a rotation center of the ball nut 4. With this, a greater rotation torque can be provided to the ball nut 4, thereby adjusting the engagement between the first sector tooth 321 and the second and third rack teeth 422, 423 more effectively.

Third Embodiment

Figure 10:
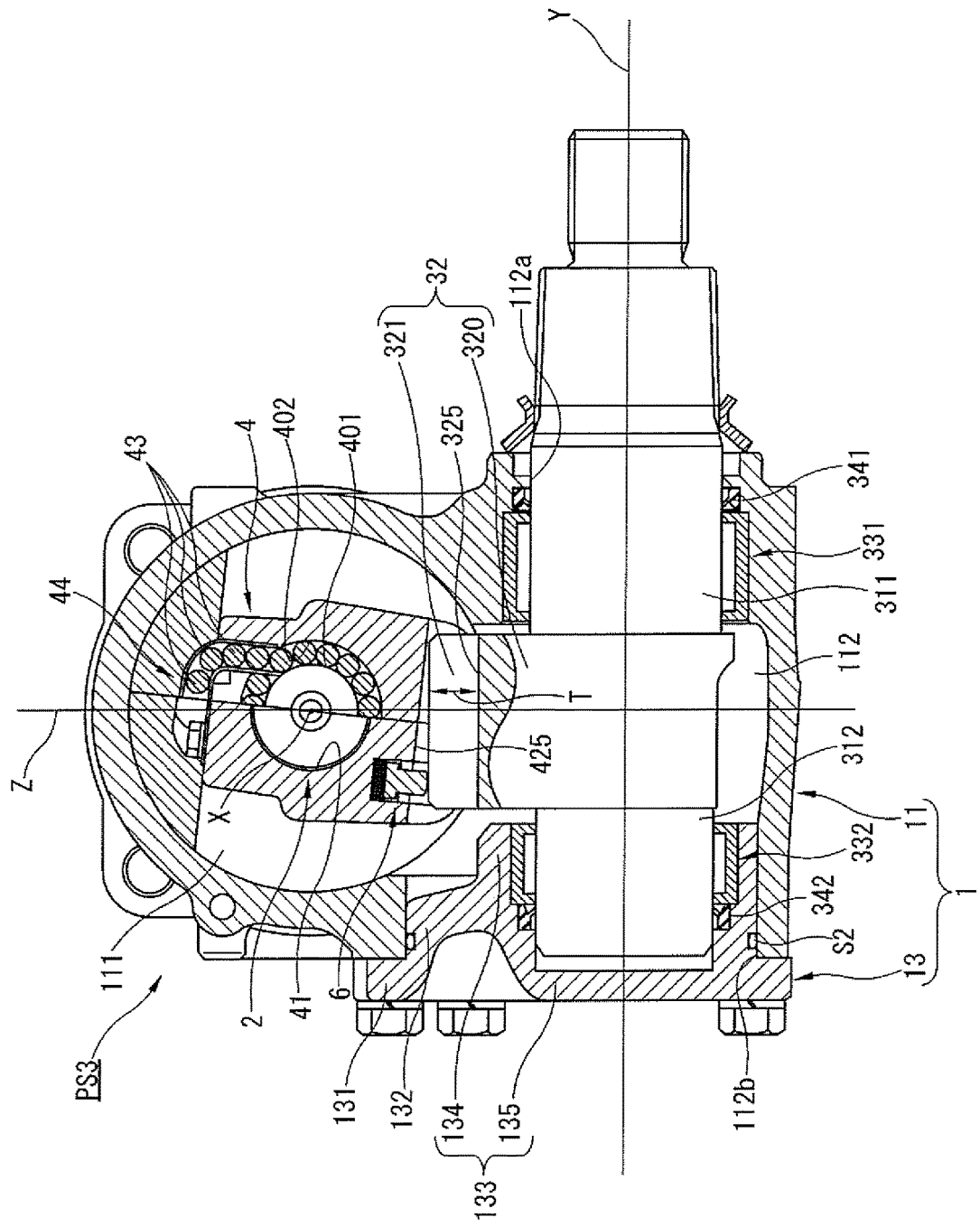
FIG. 10 is a steering device according to a third embodiment of the present invention, and shows a cross section of the steering device, which corresponds to the sectional view taken along the plane A-A of FIG. 1.

FIG. 10 shows a third embodiment of the steering device according to the present invention. In the present embodiment, a shape of the sector gear 32 of the modified example of the first embodiment is changed, but the other configuration is the same as that of the first embodiment. Therefore, the same structure or configuration as that of the first embodiment is denoted by the same reference sign, and its detailed description is omitted here.

FIG. 10 is the third embodiment of the steering device according to the present invention, showing a cross section of the steering device PS3, which corresponds to the sectional view taken along the plane A-A of FIG. 1.

As illustrated in FIG. 10, in the steering device PS3 according to the present embodiment, the backlash adjustment mechanism is removed, and the tooth bottom of the sector gear 32 is formed as a flat surface parallel to the rotation axis Y of the sector shaft 3 so that the tooth height T of the sector gear 32 is substantially constant.

As described above, in the present embodiment, the tooth bottom of the sector gear 32 has a straight shape parallel to the rotation axis Y of the sector shaft 3. That is, the present embodiment is configured so that unlike the first embodiment, without forming the tooth bottom of the sector gear 32 into the tapered shape and without providing the mechanism (the backlash adjustment mechanism) adjusting the engagement between the rack teeth 42 and the sector gear 32 other than the preload applying mechanism 6, the engagement between the rack teeth 42 and the sector gear 32 is adjusted by only the preload applying mechanism 6. Therefore, the structure or configuration of the steering device PS3 is simplified, thereby contributing to improvement in productivity of the steering device PS3 and reduction in the manufacturing cost of the steering device PS3.

Further, in the present embodiment, by the removal of the backlash adjustment mechanism, the female screw hole 136 of the third housing 13 can be removed. As a result, a problem of leaking the hydraulic fluid filling the inside of the sector shaft accommodation part 112 to the outside through the female screw hole 136 can be suppressed.

Fourth Embodiment

Figure 11:
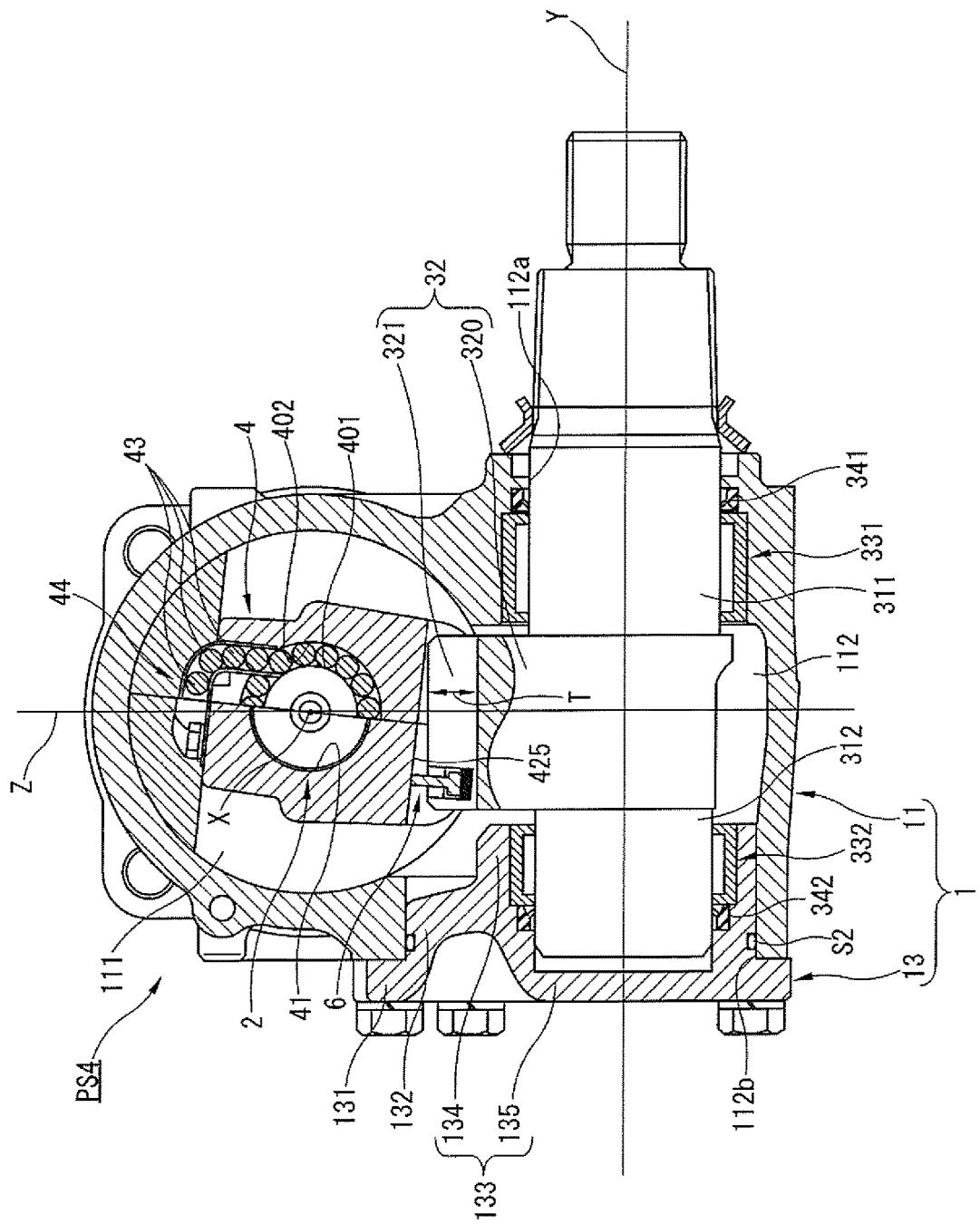
FIG. 11 is a steering device according to a fourth embodiment of the present invention, and shows a cross section of the steering device, which corresponds to the sectional view taken along the plane A-A of FIG. 6.

FIG. 11 shows a fourth embodiment of the steering device according to the present invention. In the present embodiment, a shape of the sector gear 32 of the modified example of the second embodiment is changed, but the other configuration is the same as that of the second embodiment. Therefore, the same structure or configuration as that of the second embodiment is denoted by the same reference sign, and its detailed description is omitted here.

FIG. 11 is the fourth embodiment of the steering device according to the present invention, showing a cross section of the steering device PS4, which corresponds to the sectional view taken along the plane A-A of FIG. 6.

As illustrated in FIG. 11, in the steering device PS4 according to the present embodiment, the backlash adjustment mechanism is removed, and the tooth bottom of the sector gear 32 is formed as a flat surface parallel to the rotation axis Y of the sector shaft 3 so that the tooth height T of the sector gear 32 is substantially constant.

As described above, also in the present embodiment, in the same manner as the third embodiment, the tooth bottom of the sector gear 32 has a straight shape parallel to the rotation axis Y of the sector shaft 3. Then, the present embodiment is configured so that the engagement between the rack teeth 42 and the sector gear 32 is adjusted by only the preload applying mechanism 6 without providing the mechanism (the backlash adjustment mechanism) adjusting the engagement between the rack teeth 42 and the sector gear 32 other than the preload applying mechanism 6. Therefore, the structure or configuration of the steering device PS4 is simplified, thereby contributing to improvement in the productivity of the steering device PS4 and reduction in the manufacturing cost of the steering device PS4.

Further, in the same manner as the third embodiment, by the removal of the backlash adjustment mechanism, the female screw hole 136 of the third housing 13 can be removed. Therefore, a problem of leaking the hydraulic fluid filling the inside of the sector shaft accommodation part 112 to the outside through the female screw hole 136 can be suppressed.

The present invention is not limited to the structure or configuration of the above embodiments and modified examples. Not only detail of structure or configuration of the steering device, which is not directly related to the structure or configuration of the present invention, such as structure or configuration of the steering shaft 2, an input configuration to the steering shaft 2 and shapes of the sector gear 32 and the rack teeth 42, but also structure or configuration of the preload applying mechanism 6, which is directly related to the structure or configuration of the present invention, such as shape, structure or configuration of the plunger 61 and the forcing member 62, can be freely changed according to a steering device to which the present invention is applied and specification of the vehicle without departing from the scope of the present invention.

The invention claimed is:

1. A steering device comprising:
rack teeth formed at an outer side of a ball nut screwed onto a steering shaft that is linked to a steering wheel;
a sector gear provided at a sector shaft that is linked to steered wheels, wherein the sector gear has a plurality of sector teeth including a central tooth that is most deeply engaged with the rack teeth when the sector shaft is at a neutral position which corresponds to a straight-ahead steering state, the plurality of sector teeth including the central tooth are provided in a circumferential direction of the sector shaft, and the sector gear is engaged with the rack teeth by the plurality of sector teeth including the central tooth; and
a preload applying mechanism adjusting engagement between the rack teeth and the sector gear in a vicinity of the neutral position of the sector shaft, wherein
the preload applying mechanism is provided at one end portion in a tooth width direction of a specific tooth bottom of the rack teeth, which faces a tooth tip of the central tooth when the sector shaft is in the vicinity of the neutral position,
the preload applying mechanism forces the ball nut to one side in a rotation direction of the ball nut by a reaction force generated by elastic contact of the preload applying mechanism with the tooth tip of the central tooth
the preload applying mechanism includes:
a plunger receiving hole formed at the specific tooth bottom,
a plunger which is accommodated in the plunger receiving hole so as to be able to move forward and backward and whose top end side can protrude from an opening, facing the sector gear, of the plunger receiving hole, and
a forcing member interposed between a bottom of the plunger receiving hole and the plunger and forcing the plunger toward the central tooth,
one end side in an axial direction of the sector shaft with respect to the sector gear, which is a side connected to a pitman arm, is formed so as to have a relatively large diameter, and the other end side in the axial direction of the sector shaft with respect to the sector gear is formed so as to have a relatively small diameter as compared with that of the one end side in the axial direction of the sector shaft, and
the plunger receiving hole is provided at one of both end portions in the tooth width direction of the specific tooth bottom, which corresponds to the other end side in the axial direction of the sector shaft.

2. The steering device as claimed in claim 1, wherein
the plunger has a large diameter portion sliding in the plunger receiving hole, and a small diameter portion whose diameter is reduced stepwise with respect to the large diameter portion and which can protrude from the opening of the plunger receiving hole,
the plunger receiving hole has a stopper which is formed by reducing an inside diameter of the opening to be smaller than an outside diameter of the large diameter portion and which restricts a protruding amount of the small diameter portion by coming into contact with the large diameter portion,
in a state in which a rotation phase of the sector shaft is in the vicinity of the neutral position, the large diameter portion does not come into contact with the stopper, and contact of the plunger with the central tooth is allowed, and in a state in which the rotation phase of the sector shaft exceeds the vicinity of the neutral position, the large diameter portion comes into contact with the stopper, and the contact of the plunger with the central tooth is restricted.

3. The steering device as claimed in claim 1, wherein a tooth bottom of the sector gear is formed as a flat surface parallel to a rotation axis of the sector shaft.

4. The steering device as claimed in claim 1, wherein a tooth bottom of the sector gear has such tapered surface that a tooth height of the sector gear gradually increases toward the one end side in the axial direction of the sector shaft, and the sector shaft is configured to be movable to the one end side in the axial direction of the sector shaft by an adjustment screw that is screwed from the other end side in the axial direction of the sector shaft through a female screw hole that is formed at an end wall of a housing accommodating therein the sector shaft.

5. A steering device comprising:

rack teeth formed at an outer side of a ball nut screwed onto a steering shaft that is linked to a steering wheel;

a sector gear provided at a sector shaft that is linked to steered wheels, wherein the sector gear has a plurality of sector teeth including a central tooth that is most deeply engaged with the rack teeth when the sector shaft is at a neutral position which corresponds to a straight-ahead steering state, the plurality of sector teeth including the central tooth are provided in a circumferential direction of the sector shaft, and the sector gear is engaged with the rack teeth by the plurality of sector teeth including the central tooth; and a preload applying mechanism adjusting engagement between the rack teeth and the sector gear in a vicinity of the neutral position of the sector shaft, wherein the preload applying mechanism is provided at one end portion in a tooth width direction of the central tooth, the preload applying mechanism forces the ball nut to one side in a rotation direction of the ball nut by a forcing force generated by elastic contact of the preload applying mechanism with a specific tooth bottom of the rack teeth which faces a tooth tip of the central tooth when the sector shaft is in the vicinity of the neutral position the preload applying mechanism includes:
  a plunger receiving hole formed at the central tooth,
  a plunger which is accommodated in the plunger receiving hole so as to be able to move forward and backward and whose top end side can protrude from an opening, facing the specific tooth bottom of the rack teeth, of the plunger receiving hole, and
  a forcing member interposed between a bottom of the plunger receiving hole and the plunger and forcing the plunger toward the specific tooth bottom, one end side in an axial direction of the sector shaft with respect to the sector gear, which is a side connected to a pitman arm, is formed so as to have a relatively large diameter, and the other end side in the axial direction of the sector shaft with respect to the sector gear is formed so as to have a relatively small diameter as compared with that of the one end side in the axial direction of the sector shaft, and the plunger receiving hole is provided at one of both end portions in the tooth width direction of the central tooth, which corresponds to the other end side in the axial direction of the sector shaft.

6. The steering device as claimed in claim 5, wherein the plunger has a large diameter portion sliding in the plunger receiving hole, and a small diameter portion whose diameter is reduced stepwise with respect to the large diameter portion and which can protrude from the opening of the plunger receiving hole, the plunger receiving hole has a stopper which is formed by reducing an inside diameter of the opening to be smaller than an outside diameter of the large diameter portion and which restricts a protruding amount of the small diameter portion by coming into contact with the large diameter portion, in a state in which a rotation phase of the sector shaft is in the vicinity of the neutral position, the large diameter portion does not come into contact with the stopper, and contact of the plunger with the specific tooth bottom is allowed, and in a state in which the rotation phase of the sector shaft exceeds the vicinity of the neutral position, the large diameter portion comes into contact with the stopper, and the contact of the plunger with the specific tooth bottom is restricted.

7. The steering device as claimed in claim 5, wherein a tooth bottom of the sector gear is formed as a flat surface parallel to a rotation axis of the sector shaft.

8. The steering device as claimed in claim 5, wherein a tooth bottom of the sector gear has such tapered surface that a tooth height of the sector gear gradually increases toward the one end side in the axial direction of the sector shaft, and the sector shaft is configured to be movable to the one end side in the axial direction of the sector shaft by an adjustment screw that is screwed from the other end side in the axial direction of the sector shaft through a female screw hole that is formed at an end wall of a housing accommodating therein the sector shaft.

* * * * *